United States Patent
Choi et al.

(10) Patent No.: US 11,149,213 B2
(45) Date of Patent: Oct. 19, 2021

(54) METHOD TO PRODUCE LIGHT OLEFINS FROM CRUDE OIL

(71) Applicant: SAUDI ARABIAN OIL COMPANY, Dhahran (SA)

(72) Inventors: Ki-Hyouk Choi, Dhahran (SA); Ali S. Alnasir, Dhahran (SA); Emad N. Shafei, Dhahran (SA)

(73) Assignee: SAUDI ARABIAN OIL COMPANY

( * ) Notice: Subject to any disclaimer, the term of this patent is extended or adjusted under 35 U.S.C. 154(b) by 24 days.

(21) Appl. No.: 16/729,136

(22) Filed: Dec. 27, 2019

(65) Prior Publication Data
US 2021/0198585 A1     Jul. 1, 2021

(51) Int. Cl.
C10G 55/06     (2006.01)
C10G 55/00     (2006.01)
(Continued)

(52) U.S. Cl.
CPC ............. C10G 55/06 (2013.01); B01J 3/008 (2013.01); B01J 19/245 (2013.01); C10G 55/00 (2013.01);
(Continued)

(58) Field of Classification Search
CPC .. C10G 55/06; C10G 55/00; C10G 2300/202; C10G 2300/4006; C10G 2400/02;
(Continued)

(56) References Cited

U.S. PATENT DOCUMENTS 3,944,481 A    3/1976  Wing et al.
4,042,488 A    8/1977  Perciful
(Continued)

FOREIGN PATENT DOCUMENTS

CA      3030346 A1    1/2018
JP      2008174649 A  7/2008
(Continued)

OTHER PUBLICATIONS

Ahmed et al., "Hydrothermal Stabilization of Rich Al-BEA Zeolite by Post-Synthesis Addition of Zr for Steam Catalytic Cracking of n-Dodecane", Energy Fuels, 2018, pp. 5501-5508, American Chemical Society.
(Continued)

*Primary Examiner* — Randy Boyer
*Assistant Examiner* — Juan C Valencia
(74) *Attorney, Agent, or Firm* — Bracewell LLP; Constance Gall Rhebergen

(57) ABSTRACT

Embodiments of the disclosure provide a system and method for producing light olefins from a crude oil. A crude oil feed is introduced to a crude distillation unit to produce a distillate fraction and a residue fraction. The distillate fraction is introduced to a non-catalytic steam cracker to produce a light olefin fraction and a pyrolysis oil fraction. The residue fraction is introduced to a supercritical water reactor to produce an effluent stream. The effluent stream is introduced to a flash separator to produce a gas phase fraction and a liquid phase fraction. The gas phase fraction is introduced to a catalytic steam cracker to produce a light olefin fraction and a pyrolysis oil fraction. Optionally, the residue fraction is introduced to a vacuum distillation unit to produce a light vacuum gasoil fraction, a heavy vacuum gasoil fraction, and a vacuum residue fraction. The vacuum residue fraction is introduced to a solvent deasphalting unit to produce a deasphalted oil and a pitch fraction. The deasphalted oil fraction, optionally combined with the heavy vacuum gasoil fraction, can be introduced to the supercritical water reactor in lieu of the residue fraction.

22 Claims, 3 Drawing Sheets

(51) Int. Cl.
  *B01J 19/24* (2006.01)
  *B01J 3/00* (2006.01)
  *C10L 1/06* (2006.01)
  *B01D 3/10* (2006.01)
  *B01D 3/06* (2006.01)

(52) U.S. Cl.
  CPC .............. *C10L 1/06* (2013.01); *B01D 3/06* (2013.01); *B01D 3/10* (2013.01); *C10G 2300/107* (2013.01); *C10G 2300/1074* (2013.01); *C10G 2300/1077* (2013.01); *C10G 2300/202* (2013.01); *C10G 2300/206* (2013.01); *C10G 2300/308* (2013.01); *C10G 2300/4006* (2013.01); *C10G 2300/4012* (2013.01); *C10G 2300/805* (2013.01); *C10G 2400/02* (2013.01); *C10G 2400/20* (2013.01); *C10G 2400/22* (2013.01); *C10L 2200/0423* (2013.01); *C10L 2270/023* (2013.01); *C10L 2290/543* (2013.01)

(58) Field of Classification Search
  CPC ......... C10G 2300/206; C10G 2400/20; C10G 2300/1074; C10G 2300/107; C10G 2300/1077; C10G 2200/0423; C10G 2300/4012; C10G 2300/308; C10G 2300/805; C10G 2400/22; B01J 19/245; B01J 3/008; C10L 1/06; C10L 2270/023; C10L 2200/0423; C10L 2290/543; B01D 3/06; B01D 3/10
  See application file for complete search history.

(56) References Cited

U.S. PATENT DOCUMENTS

| | | | |
|---|---|---|---|
| 4,938,876 | A | 7/1990 | Ohsol |
| 5,882,506 | A | 3/1999 | Ohsol et al. |
| 6,867,341 | B1 | 3/2005 | Abrevaya et al. |
| 7,019,187 | B2 | 3/2006 | Powers |
| 8,864,978 | B2 | 10/2014 | Choi |
| 9,090,836 | B2 | 7/2015 | Brown et al. |
| 9,505,678 | B2 | 11/2016 | Choi et al. |
| 9,550,707 | B2 | 1/2017 | Schrod et al. |
| 9,562,199 | B2 | 2/2017 | Pereira Almao et al. |
| 9,650,578 | B2 | 5/2017 | De Klerk et al. |
| 9,920,258 | B2 | 3/2018 | Choi et al. |
| 9,951,283 | B2 | 4/2018 | Choi et al. |
| 9,957,450 | B2 | 5/2018 | Choi et al. |
| 10,005,962 | B2 | 6/2018 | Iversen |
| 10,011,790 | B2 | 7/2018 | Choi et al. |
| 10,099,210 | B2 | 10/2018 | Al-Hazmi et al. |
| 10,526,552 | B1 * | 1/2020 | Choi ................ C10G 9/36 |
| 2013/0184505 | A1 | 7/2013 | Maxwell |
| 2013/0296619 | A1 | 11/2013 | Iaccino et al. |
| 2016/0010003 | A1 | 1/2016 | Walters et al. |
| 2017/0166821 | A1 | 6/2017 | Choi et al. |
| 2017/0298280 | A1 | 10/2017 | Vermeiren et al. |
| 2018/0187104 | A1 | 7/2018 | Yusuf et al. |
| 2018/0265792 | A1 * | 9/2018 | Choi ................ C10G 69/06 |
| 2019/0055482 | A1 | 2/2019 | Salazar-Guillen et al. |
| 2019/0248717 | A1 | 8/2019 | Gaffney et al. |
| 2019/0249093 | A1 | 8/2019 | Choi et al. |
| 2019/0264110 | A1 | 8/2019 | Choi et al. |

FOREIGN PATENT DOCUMENTS

| | | |
|---|---|---|
| WO | 2013000067 A1 | 1/2013 |
| WO | 2019138002 A1 | 7/2019 |

OTHER PUBLICATIONS

Akah et al., "Reactivity of naphtha fractions for light olefins production", International Journal of Industrial Chemistry, 2017, pp. 221-233, Springer.

Choi et al., "An approach to the deep hydrodesulfurization of light cycle oil", Applied Catalysis B: Environmental, 2004, pp. 275-283, Elsevier.

Sukhdeep Singh Gill, "Reactor Design for Partial Upgrading of Bitumen via Aquaprocessing", A thesis submitted to the faculty of Graduate Studies in partial fulfilment of the requirements for the degree of Master of Science, 2018, pp. 124, Sukhdeep Gill.

Yamaguchi et al., "Deactivation of ZSM-5 zeolite during catalytic steam cracking of n-hexane", Fuel Processing Technology, 2014, pp. 343-349, Elsevier.

PCT ISRWO dated Apr. 15, 2021, in the prosecution of International Application No. PCT/US2020/066945, 12 pages.

* cited by examiner

METHOD TO PRODUCE LIGHT OLEFINS FROM CRUDE OIL

TECHNICAL FIELD

Embodiments of the disclosure are generally directed to hydrocarbon processing. More specifically, embodiments of the disclosure are directed to methods and systems producing light olefins such as ethylene and propylene from a hydrocarbon fraction.

BACKGROUND

Conventionally, steam cracking involves radical-mediated cracking reactions to produce light olefins such as ethylene and propylene from a hydrocarbon feed. Steam cracking typically requires an operating temperature ranging between about 750 deg. C. and about 950 deg. C. to cleave terminal (or close to terminal) carbon-carbon bonds to produce light olefins. On the other hand, an operating temperature of less than about 750 deg. C. results in the cleavage of internal carbon-carbon bonds that are not directly related to the formation of light olefins. In addition, steam cracking typically requires a residence time of less than about 1 second to prevent oligomerization of the produced light olefins into longer chained hydrocarbons or to prevent aromatization of the produced light olefins into aromatic hydrocarbons. A typical steam cracker is operated at a slightly elevated pressure greater than atmospheric pressure and at a steam-to-oil mass ratio ranging between about 0.5 and about 1.0.

The most challenging aspect of steam cracking is coke formation. Although there is no dominant school of thought regarding the detailed mechanism of such coke formation, it is known that homogeneous coke formation is due to condensation of aromatic compounds in gas phase and subsequent adsorbing of those aromatic compounds to the coil surface of the steam cracker. It is known that heterogeneous coke formation is due to the presence of certain coil surface metals such as nickel and iron. In general, coke formed in the coil is responsible for reducing the heat transfer rate, that is, an increased magnitude of heat energy is required to maintain the operating temperature of fluids present in the coil. In addition, coke is responsible for increasing the pressure drop through the cracking coil. In such occasions, a decoking sequence is necessary to remove the coke deposited in the coil.

One parameter indicative of how often the coil should undergo a decoking sequence is run length, that is, the period between two decoking sequences. A gaseous hydrocarbon feed such as ethane provides a longer run length than that of a liquid hydrocarbon feed. Among liquid hydrocarbon feeds, naphtha provides a longer run length than that of gasoil. In general, steam cracking of a heavier hydrocarbon feed corresponds to a shorter run length, a reduced yield of light olefins, and a greater coking rate relative to a lighter hydrocarbon feed. A shorter run length corresponds to frequent shutdown of the steam cracker and accordingly reduced production.

In petroleum-based crude oils, various types of molecules are present. Per their chemical structure, molecules can be classified as a paraffin, olefin, naphthene (a cyclic paraffin), and aromatic, which can be indicated by an oil composition's PONA number. Of the molecules, it is most efficient to convert paraffins to light olefins, with n-paraffins being more effectively converted than iso-paraffins, and for this reason n-paraffins can be preferred. Aromatics, such as benzene and toluene, are stable at high temperatures, have a low hydrogen to carbon ratio, and are known to be an effective precursor for coke formation. The stability of aromatics can be contributed to the carbon-carbon bond energies of the aromatic carbon, as compared to the carbon-carbon bond energies of paraffinic carbons. For these reasons, aromatics are difficult to convert and are not a good source for producing light olefins. Naphthenes as a source material are more difficult to convert than paraffins, but easier to convert than aromatics. Olefinic compounds are generally cracked in a steam cracker to produce light paraffins and olefins along with aromatics through cyclization followed by dehydrogenation reactions. Thus, a feedstock for steam cracking preferably contains a majority of n-paraffins, followed by iso-paraffins, and naphthenes with little or no olefins or aromatics.

Steam cracking cannot effectively process heavy fractions that contain asphaltenes. Steam cracking of asphaltenes can produce coke, which can result in plugging of the process lines.

Some pre-treatment steps can be taken to produce gasoil or other heavy oils suitable for use as a steam cracking feedstock. Pre-treatment approaches can include hydrotreatment, thermal conversion, extraction, and distillation. Extraction processes can include a solvent deasphalting process. However, such processes produce liquid yields of less than 80% by volume, resulting in analogous low product recovery from steam cracking. In addition, pre-treatment processes can increase the cost per barrel to the resultant products.

Steam cracking of a heavier feedstock is preferred for increasing the yield of useful hydrocarbons heavier than light olefins. However, a relatively heavier feedstock typically has a relatively greater aromaticity, which leads to severe coking and a shorter run length than a relatively lighter feedstock such as straight run naphtha. As stated above, coke is formed through certain chemical reactions at a relatively high operating temperature ranging between about 750 deg. C. and about 950 deg. C. One approach to mitigate such coke formation is to produce useful hydrocarbons from a heavy feedstock at a relatively lower operating temperature; however, this results in an undesirable lesser yield of light olefins. A more robust process design is necessary to accommodate a heavier feedstock at a relatively higher operating temperature for producing useful hydrocarbons (including light olefins) via steam cracking. For example, certain alloys are required for use as cracking coil or a complex energy recovery system is implemented for energy preservation, all of which contribute to an increase in investment and operating costs.

SUMMARY

Embodiments of the disclosure are generally directed to hydrocarbon processing. More specifically, embodiments of the disclosure are directed to methods and systems for producing light olefins such as ethylene and propylene from a hydrocarbon fraction.

Embodiments of the disclosure provide a method for producing light olefins from a crude oil. The method includes the step of introducing a crude oil feed to a crude distillation unit to produce a distillate fraction and a residue fraction. The crude oil feed includes the crude oil. The distillate fraction includes hydrocarbons having a true boiling point less than that of the residue fraction. The method includes the step of introducing the distillate fraction to a first steam cracker. The first steam cracker is operated at a temperature and pressure such that the distillate fraction undergoes cracking reactions in the presence of steam to produce a first light olefin fraction and a first pyrolysis oil fraction. The first light olefin fraction includes the light olefins. The method includes the step of introducing the residue fraction to a supercritical water reactor. The supercritical water reactor is operated at a pressure equal to or greater than 22.06 megapascals (MPa) and a temperature equal to or greater than 373.9 deg. C. such that the residue fraction undergoes conversion reactions in the presence of supercritical water to produce an effluent stream. The method includes the step of introducing the effluent stream to a flash separator to produce a gas phase fraction and a liquid phase fraction. The method includes the step of introducing the gas phase fraction to a second steam cracker. The second steam cracker is a catalytic steam cracker. The second steam cracker is operated at a temperature and pressure such that the gas phase fraction undergoes cracking reactions in the presence of steam to produce a second light olefin fraction and a second pyrolysis oil fraction. The second light olefin fraction includes the light olefins.

In some embodiments, the crude oil has an atmospheric residue content of greater than 24 wt. %. In some embodiments, the distillate fraction includes naphtha and atmospheric gasoil. The residue fraction includes atmospheric residue.

In some embodiments, the method further includes the step of introducing water to the first steam cracker. In some embodiments, the first steam cracker is in the absence of an external supply of catalyst. In some embodiments, the first steam cracker is in the absence of an external supply of hydrogen. In some embodiments, the first pyrolysis oil fraction includes gasoline and fuel oil.

In some embodiments, the method further includes the step of introducing water to the supercritical water reactor. In some embodiments, internal fluids of the supercritical water reactor have a water-to-oil mass ratio between 1 and 4 at standard ambient temperature and pressure (SATP). In some embodiments, the supercritical water reactor is operated at a temperature ranging between 415 deg. C. and 443 deg. C. and a pressure ranging between 24 MPa and 28 MPa.

In some embodiments, the flash separator is operated at a temperature ranging between 200 deg. C. and 350 deg. C. and a pressure ranging between 0.01 MPa and 1 MPa. In some embodiments, the gas phase fraction includes naphtha and atmospheric gasoil. In some embodiments, the gas phase stream has a water content ranging between 30 wt. % and 80 wt. %.

In some embodiments, the second steam cracker includes a zeolite catalyst such as a Zeolite Socony Mobil-22 (ZSM-22) type, a Zeolite Socony Mobil-23 (ZSM-23) type, an acidic Zeolite Socony Mobil-5 (HZSM-5) type, a Zr-modified Zeolite Beta (BEA) type, and combinations of the same. In some embodiments, the second steam cracker is in the absence of an external supply of hydrogen. In some embodiments, the second pyrolysis oil fraction includes gasoline and fuel oil.

In some embodiments, the method further includes the step of introducing the residue fraction to a vacuum distillation unit to produce a light vacuum gasoil fraction, a heavy vacuum gasoil fraction, and a vacuum residue fraction. The method further includes the step of introducing the vacuum residue fraction to a solvent deasphalting unit to produce a deasphalted oil fraction and a pitch fraction. The pitch fraction includes asphaltenes. The deasphalted oil fraction is introduced to the supercritical water reactor in lieu of the residue fraction.

In some embodiments, the method further includes the step of introducing the residue fraction to a vacuum distillation unit to produce a light vacuum gasoil fraction, a heavy vacuum gasoil fraction, and a vacuum residue fraction. The method further includes the step of introducing the vacuum residue fraction to a solvent deasphalting unit to produce a deasphalted oil fraction and a pitch fraction. The pitch fraction includes asphaltenes. The method further includes the step of combining the heavy vacuum gasoil fraction and the deasphalted oil fraction to produce a mixed stream. The mixed stream is introduced to the supercritical water reactor in lieu of the residue fraction.

Embodiments of the disclosure also provide a system for producing light olefins from a crude oil. The system includes a crude distillation unit, a first steam cracker, a supercritical water reactor, a flash separator, and a second steam cracker. The crude distillation unit configured to separate a crude oil feed into a distillate fraction and a residue fraction. The crude oil feed includes the crude oil having an atmospheric residue content of greater than 24 wt. %. The distillate fraction includes naphtha and atmospheric gasoil. The residue fraction includes atmospheric residue. The first steam cracker is fluidly connected downstream of the crude distillation unit. The first steam cracker is configured to be operated at a temperature and pressure such that the distillate fraction undergoes cracking reactions in the presence of steam to produce a first light olefin fraction and a first pyrolysis oil fraction. The first light olefin fraction includes the light olefins. The first pyrolysis oil fraction includes gasoline and fuel oil. The supercritical water reactor is fluidly connected downstream of the crude distillation unit. The supercritical water reactor is configured to be operated at a pressure equal to or greater than 22.06 MPa and a temperature equal to or greater than 373.9 deg. C. such that the residue fraction undergoes conversion reactions in the presence of supercritical water to produce an effluent stream. The flash separator is fluidly connected downstream of the supercritical water reactor. The flash separator is configured to separate the effluent stream into a gas phase fraction and a liquid phase fraction. The second steam cracker is fluidly connected downstream of the flash separator. The second steam cracker is a catalytic steam cracker. The second steam cracker is configured to be operated at a temperature and pressure such that the gas phase fraction undergoes cracking reactions in the presence of steam to produce a second light olefin fraction and a second pyrolysis oil fraction. The second light olefin fraction includes the light olefins. The second pyrolysis oil fraction includes gasoline and fuel oil.

In some embodiments, the second steam cracker includes a zeolite catalyst such as a ZSM-22 type, a ZSM-23 type, an HZSM-5 type, a Zr-modified BEA type, and combinations of the same.

In some embodiments, the system further includes a vacuum distillation unit and a solvent deasphalting unit. The vacuum distillation unit is fluidly connected downstream of the crude distillation unit. The vacuum distillation unit is configured to separate the residue fraction into a light vacuum gasoil fraction, a heavy vacuum gasoil fraction, and a vacuum residue fraction. The solvent deasphalting unit is fluidly connected downstream of the vacuum distillation unit and fluidly connected upstream of the supercritical water reactor. The solvent deasphalting unit is configured to separate the vacuum residue fraction into a deasphalted oil fraction and a pitch fraction. The pitch fraction includes asphaltenes. The deasphalted oil fraction is introduced to the supercritical water reactor in lieu of the residue fraction.

In some embodiments, the system further includes a vacuum distillation unit, a solvent deasphalting unit, and a mixer. The vacuum distillation unit is fluidly connected downstream of the crude distillation unit. The vacuum distillation unit is configured to separate the residue fraction into a light vacuum gasoil fraction, a heavy vacuum gasoil fraction, and a vacuum residue fraction. The solvent deasphalting unit is fluidly connected downstream of the vacuum distillation unit. The solvent deaspalting unit is configured to separate the vacuum residue fraction into a deasphalted oil fraction and a pitch fraction. The pitch fraction includes asphaltenes. The mixer is fluidly connected downstream of the vacuum distillation unit, fluidly connected downstream of the solvent deasphalting unit, and fluidly connected upstream of the supercritical water reactor. The mixer is configured to combine the heavy vacuum gasoil fraction and the deasphalted oil fraction to produce a mixed stream. The mixed stream is introduced to the supercritical water reactor in lieu of the residue fraction.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
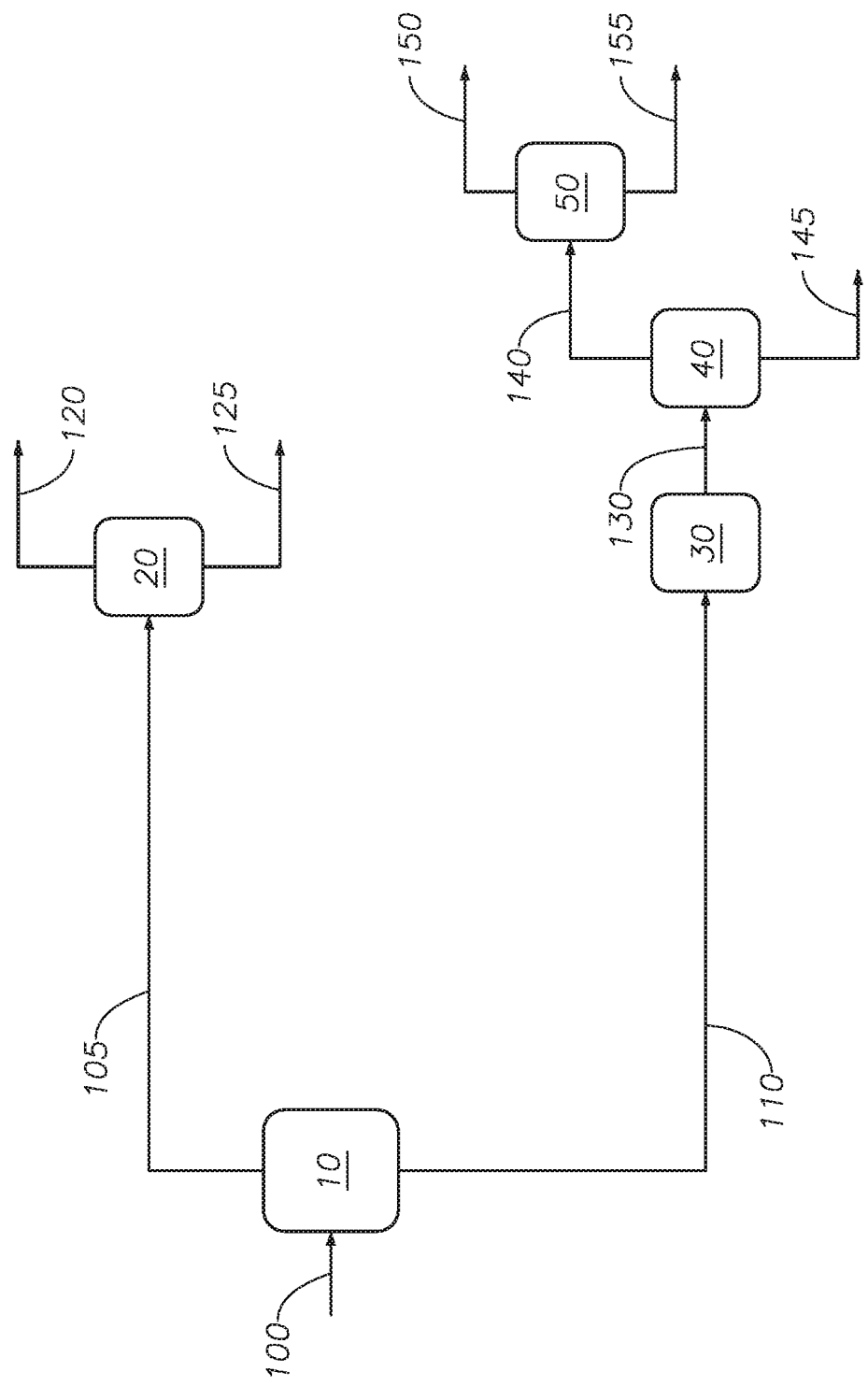
FIG. 1 provides a schematic diagram of a process for light olefin production, according to an embodiment of the disclosure.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

Described here are processes and systems of an integrated supercritical water and a catalytic steam cracking process. The supercritical water process can convert a heavy hydrocarbon fraction to a feedstock suitable for catalytic steam cracking to produce light olefins, such as ethylene and propylene. The integrated supercritical water and catalytic steam cracking process leads to synergy improving conversion to olefins.

Due to the relatively lesser hydrogen content of heavy residua, conventional non-catalytic steam cracking typically requires an external supply of hydrogen before cracking, where the heavy residua undergoes hydrotreating or hydrocracking, or both, before being introduced to a non-catalytic steam cracking process. Here, the processes and systems of a supercritical water process upstream of a catalytic steam cracking process can advantageously overcome such drawbacks of conventional pre-treating processes upstream of a steam cracking process for producing olefins by utilizing heavy residua. In addition, the processes and systems of an integrated supercritical water and catalytic steam cracking process described here can overcome the limitation of utilizing heavy residua (having a relatively lesser hydrogen content) for olefin production without having an external supply of hydrogen introduced to the process as a prerequisite step while producing sufficient quantities of olefins.

The processes and systems of an integrated supercritical water process described here can decrease the amount of heavy residue fractions, such as atmospheric residue and vacuum residue, in the product stream as compared to the feed stream. In this manner, the following catalytic steam cracking process can receive an increased quantity of an olefin precursor feed for increased olefin production. Advantageously, the relatively heavier fractions (that are unfavorable for non-catalytic steam cracking) produced from a crude distillation unit need not be introduced to a non-catalytic steam cracking process but are introduced to a supercritical water process, then to a catalytic steam cracking process.

The processes and systems implementing supercritical water described here can decrease the concentration of heteroatoms, such as sulfur compounds and metal compounds in the product relative to the feed. Advantageously, using a feed having a reduced heteroatom content for catalytic steam cracking can extend the life of the catalyst.

Advantageously, the processes and systems of an integrated supercritical water and catalytic steam cracking process described here can expand the range of crude oils suitable for use to produce light olefins.

As used throughout this disclosure, "hydrogen content" refers to the quantity of the hydrogen atoms bonded to carbon atoms and does not refer to free hydrogen.

As used throughout this disclosure, "external supply of hydrogen" refers to the addition of hydrogen to the feed to the reactor or to the reactor itself. For example, a reactor in the absence of an external supply of hydrogen means that the feed to the reactor and the reactor are in the absence of added hydrogen, gas ($H_2$) or liquid, such that no hydrogen (in the form $H_2$) is a feed or a part of a feed to the reactor.

As used throughout this disclosure, "external supply of catalyst" refers to the addition of catalyst to the feed to the reactor or the presence of a catalyst in the reactor, such as a fixed bed catalyst in the reactor. For example, a reactor in the absence of an external supply of catalyst means no catalyst has been added to the feed to the reactor and the reactor does not contain a catalyst bed in the reactor.

As used throughout this disclosure, "crude oil" refers to petroleum hydrocarbon streams that can include whole range crude oil, reduced crude oil, and refinery streams. "Whole range crude oil" refers to passivated crude oil which has been processed by a gas-oil separation plant after being recovered from a production well. "Reduced crude oil" can also be known as "topped crude oil" and refers to a crude oil having no light fraction, and would include an atmospheric residue stream or a vacuum residue stream. Refinery streams can include "cracked oil," such as light cycle oil, heavy cycle oil, and streams from a fluid catalytic cracking unit (FCC), such as slurry oil or decant oil, a heavy stream from hydrocracker with a boiling point greater than 343 deg. C., a deasphalted oil (DAO) stream from a solvent extraction process, and a mixture of atmospheric residue and hydrocracker bottom fractions.

As used throughout this disclosure, "heavy oil" refers to hydrocarbons heavier than gasoil and can include heavy vacuum gasoil, light vacuum gasoil, atmospheric residue, vacuum residue, and combinations of the same.

As used throughout this disclosure, "atmospheric residue" refers to the fraction of oil-containing streams having a true boiling point (TBP) 5% of about 340 deg. C. About 95 wt. % of the hydrocarbons have boiling points greater than about 340 deg. C. and includes the vacuum residue fraction. Atmospheric residue can refer to the composition of an entire stream, such as when the feedstock is from an atmospheric distillation unit, or can refer to a fraction of a stream, such as when a whole range crude oil is used.

As used throughout this disclosure, "naphtha" refers to the fraction of oil-containing streams having a TBP 5% of about 30 deg. C. and a TBP 95% of about 260 deg. C. About 90 wt. % of the hydrocarbons have boiling points between about 180 deg. C. and about 260 deg. C. Naphtha can refer to the composition of an entire stream, such as when the feedstock is from an atmospheric distillation unit, or can refer to a fraction of a stream, such as when a whole range crude oil is used.

As used throughout this disclosure, "atmospheric gasoil" refers to the fraction of oil-containing streams having a TBP 5% of about 290 deg. C. and a TBP 95% of about 360 deg. C. About 90 wt. % of the hydrocarbons have boiling points between about 290 deg. C. and about 360 deg. C. Atmospheric gasoil can refer to the composition of an entire stream, such as when the feedstock is from an atmospheric distillation unit, or can refer to a fraction of a stream, such as when a whole range crude oil is used.

As used throughout this disclosure, "light vacuum gasoil" refers to the fraction of oil-containing streams having a TBP 5% of about 380 deg. C. and a TBP 95% of about 450 deg. C. About 90 wt. % of the hydrocarbons have boiling points between about 380 deg. C. and about 450 deg. C. Light vacuum gasoil can refer to the composition of an entire stream, such as when the feedstock is from a vacuum distillation unit, or can refer to a fraction of a stream, such as when a whole range crude oil is used.

As used throughout this disclosure, "heavy vacuum gasoil" refers to the fraction of oil-containing streams having a TBP 5% of about 470 deg. C. and a TBP 95% of about 580 deg. C. About 90 wt. % of the hydrocarbons have boiling points between about 470 deg. C. and about 580 deg. C. Heavy vacuum gasoil can refer to the composition of an entire stream, such as when the feedstock is from a vacuum distillation unit, or can refer to a fraction of a stream, such as when a whole range crude oil is used.

As used throughout this disclosure, "vacuum residue" refers to the fraction of oil-containing streams having a TBP 5% of about 520 deg. C. About 95 wt. % of the hydrocarbons have boiling points greater than about 520 deg. C. Vacuum residue can refer to the composition of an entire stream, such as when the feedstock is from a vacuum distillation unit or can refer to a fraction of stream, such as when a whole range crude oil is used.

As used throughout this disclosure, "gasoline" refers to the fraction of oil-containing streams having a TBP 5% of about 30 deg. C. and a TBP 95% of about 220 deg. C. About 95 wt. % of the hydrocarbons in gasoline can have boiling points between about 30 deg. C. and about 220 deg. C. Gasoline can refer to the composition of an entire stream, such as when the stream is from a steam cracker, or can refer to a fraction of a stream, such as when a whole range crude oil is used.

As used throughout this disclosure, "fuel oil" refers to the fraction of oil-containing streams having a TBP 5% of about 200 deg. C. and a TBP 95% of about 650 deg. C. In some embodiments, fuel oil obtained from a steam cracker is referred to as pyrolysis fuel oil (PFO). Fuel oil can have a boiling point ranging between about 200 deg. C. and about 650 deg. C. (when PFO is combined with conventional fuel oil such as Bunker-C) or alternately between about 200 deg. C. and about 500 deg. C. Fuel oil can refer to the composition of an entire stream, such as when the stream is from a steam cracker, or can refer to a fraction of a stream, such as when a whole range crude oil is used.

As used throughout this disclosure, "asphaltene" refers to the fraction of an oil-containing stream which is not soluble in a n-alkane, particularly, n-heptane (a C7 n-alkane).

As used throughout this disclosure, "light olefin" refers to ethylene, propylene, iso-butene, 1-butene, cis-2-butene, trans-2-butene, 1,3-butadiene and combinations of the same. Each of ethylene, propylene, iso-butene, 1-butene, cis-2-butene, trans-2-butene, 1,3-butadiene is a light olefin and together they are light olefins.

As used throughout this disclosure, "distillate" refers to the hydrocarbon fraction lighter than the distillation residue from an atmospheric distillation process or a vacuum distillation process.

As used throughout this disclosure, "coke" refers to the toluene insoluble material present in petroleum.

As used throughout this disclosure, "cracking" refers to the breaking of hydrocarbons into smaller ones containing few carbon atoms due to the breaking of carbon-carbon bonds.

As used throughout this disclosure, "upgrade" means one or all of increasing API gravity, decreasing the amount of impurities, such as sulfur, nitrogen, and metals, decreasing the amount of asphaltene, and increasing the amount of distillate in a process outlet stream relative to the process feed stream. One of skill in the art understands that upgrade can have a relative meaning such that a stream can be upgraded in comparison to another stream, but can still contain undesirable components such as impurities.

As used throughout this disclosure, "conversion reactions" refers to reactions that can upgrade a hydrocarbon stream including cracking, isomerization, alkylation, dimerization, aromatization, cyclization, desulfurization, denitrogenation, deasphalting, and demetallization.

As used throughout this disclosure, "non-catalytic steam cracking" refers to a process where thermal cracking reactions occur in the presence of steam but in the absence of a catalyst. Steam cracking can include a furnace. The furnace can include a convection section and a radiation section. The convection section can be used for preheating a feedstock stream, a water stream, and other streams. The convection section can operate at a temperature at or greater than about 650 deg. C. The convection section can operate at a slightly elevated pressure greater than atmospheric pressure. Steam can be injected with the hydrocarbon stream in the convection section. Vaporization of the feed to a steam cracking process can increase light olefin production. Without being bound by any theory, vapor-phase cracking of hydrocarbons in the convection section can lead to formation of light molecules, such as $C_2$ and $C_3$ compounds, while liquid-phase cracking can lead to middle range molecules, such as $C_7$ and $C_8$ compounds. Operating conditions to increase vaporization are maintained to avoid the conversion to coke due to non-vaporized hydrocarbons. Steam, as a diluent, can suppress coke formation. After passing through the convection section, the stream can enter the radiation section where thermal cracking can occur. The radiation section can operate at a temperature between about 700 deg. C. and about 950 deg. C. The radiation section can operate at a slightly elevated pressure greater than atmospheric pressure. The radiation section can be used for severe cracking of hydrocarbons to produce light olefins.

As used throughout this disclosure, "supercritical water process" refers to a process where a hydrocarbon fraction undergoes conversion reactions in the presence of supercritical water at supercritical conditions of water to produce an upgraded hydrocarbon stream. A supercritical water process includes a pre-reaction stage, a reaction stage, and a post-reaction stage. The pre-reaction stage can include units to pressurize, heat and mix the feed streams, such as pumps, heaters, and mixers. The reaction stage can include at least one supercritical water reactor. The post-reaction stage can include units to separate the effluent from the reaction stage and can include heat exchangers, pressure letdown devices, and one or more separation vessels.

It is known in the art that hydrocarbon reactions in supercritical water upgrade heavy oil and crude oil (that may contain sulfur compounds) to produce products that have a greater light fraction content than the heavy oil and crude oil feedstock. Supercritical water has unique properties making it suitable for use as a petroleum reaction medium where the reaction objectives can include upgrading reactions, desulfurization reactions denitrogenation reactions, and demetallization reactions. Supercritical water is water at a temperature at or greater than the critical temperature of water and at a pressure at or greater than the critical pressure of water. The critical temperature of water is 373.946° C. The critical pressure of water is 22.06 MPa. Without being bound to any theory, it is understood that the basic reaction mechanism of supercritical water mediated petroleum processes corresponds to a free radical reaction mechanism. Thermal energy creates radicals through chemical bond breakage. Supercritical water creates a "cage effect" by surrounding the radicals. The radicals surrounded by water molecules cannot react easily with each other, and thus, intermolecular reactions that contribute to coke formation are suppressed. The cage effect suppresses coke formation by limiting inter-radical reactions compared to conventional thermal cracking processes, such as delayed coker. Thermal cracking of a paraffin feed can produce paraffins and olefins having reduced numbers of carbons per molecule as compared to the paraffin feed. The relative amount of paraffins and olefins and the distribution of carbon numbers strongly depends on the phase where the thermal cracking occurs. In the liquid phase, faster hydrogen transfer between molecules occurs due to the high density creating closer distances between the molecules which makes hydrogen transfer between molecules easier and faster. Thus, the liquid phase facilitates the formation of more paraffins than gas-phase cracking. Additionally, liquid phase cracking shows generally even distribution of the carbon numbers of the product while gas phase cracking has more light paraffins and olefins in the product. While, supercritical water facilitates hydrogen transfer between molecules, it is inevitable to produce unsaturated hydrocarbons due to a limited amount of available hydrogen. Unsaturated carbon-carbon bonds can be distributed through the whole range of boiling points. Olefins, as a representative unsaturated hydrocarbon, are valuable chemicals, but low stability can cause many problems such as gum formation when exposed to air. Thus, it is common practice in the modern refinery to saturate olefins with hydrogen in the presence of catalyst. Advantageously, at supercritical conditions, water acts as both a hydrogen source and a solvent (diluent) in upgrading reactions, desulfurization reactions and demetallization reactions and a catalyst is not needed. Hydrogen from the water molecules is transferred to the hydrocarbons through direct transfer or through indirect transfer, such as the water gas shift reaction.

Without being bound by any theory, alpha olefins can be produced by supercritical water process due to beta scission of alkyl aromatics. For example, the terminal carbon-carbon bond dissociation energy of ethylbenzene of 301 kilojoules per mole (kJ/mol) is less than the carbon-carbon bond dissociation energy of ethane, which is 368 kJ/mol. Due to the dilution effect as well as cage effect in supercritical water conditions, the resulting alpha olefins can survive from being isomerized to form internal olefins or saturated to form paraffins. Such beta scission can be observed in thermal cracking temperatures of greater than about 400 deg. C. A temperature greater than 400 deg. C. is necessary to obtain meaningful conversion. The alpha-olefins as well as certain paraffins produced by the supercritical water process can be used in a catalytic steam cracking process to produce light olefins such as ethylene and propylene.

FIG. 1 shows a schematic diagram of a process for light olefin production, according to an embodiment of the disclosure. The process can include a crude distillation unit 10, a non-catalytic steam cracker 20, a supercritical water reactor 30, a flash separator 40, and a catalytic steam cracker 50.

A crude oil feed 100 is introduced to the process. The crude oil feed 100 can be obtained from any oil source derived from petroleum, coal liquid, or biomaterials. Non-limiting examples of crude oil used for the crude oil feed 100 can include whole range crude oil, distilled crude oil, topped crude oil, refinery streams, liquefied coals, liquid products recovered from oil or tar sands, bitumen, oil shale, asphaltene, liquid hydrocarbons recovered from gas-to-liquid (GTL) processes, and biomass derived hydrocarbons. The crude oil feed 100 can have an API gravity ranging between about 19 to about 54 or alternately between about 24 and about 40. For example, a Manifa crude oil has an API gravity of about 24. An Arab extra light crude oil has an API gravity of about 40. The crude oil feed 100 can include an atmospheric residue fraction greater than about 17 wt. % of the total crude oil or alternately greater than about 24 wt. % of the total crude oil.

The crude oil feed 100 is introduced to the crude distillation unit 10. The crude distillation unit 10 can be any hydrocarbon processing unit capable of separating crude oil into various fractions of different boiling ranges. In at least one embodiment, the crude distillation unit 10 is an atmospheric distillation unit. The crude distillation unit 10 produces a distillate fraction 105 and an atmospheric residue fraction 110. The distillate fraction 105 includes naphtha and atmospheric gasoil. The atmospheric residue fraction 110 includes atmospheric residue.

The distillate fraction 105 is introduced to the non-catalytic steam cracker 20. The non-catalytic steam cracker 20 can be any hydrocarbon processing unit capable of steam cracking a hydrocarbon fraction including naphtha and atmospheric gasoil. In at least one embodiment, the non-catalytic steam cracker 20 is in the absence of an external supply of catalyst. In at least one embodiment, the non-catalytic steam cracker 20 is in the absence of an external supply of hydrogen. The non-catalytic steam cracker 20 can be maintained at a temperature ranging between about 700 deg. C. and about 950 deg. C., alternately between about 750 deg. C. and about 900 deg. C., or alternately between about 750 deg. C. and about 875 deg. C. In at least one embodiment, the non-catalytic steam cracker 20 is maintained at a temperature ranging between about 700 deg. C. and about 830 deg. C. Means for maintaining such temperature of the non-catalytic steam cracker 20 can include a fired heater, box furnace, strip heater, immersion heater, tubular furnace, heat exchanger, or like devices known in the art. The non-catalytic steam cracker 20 can be maintained at a slightly elevated pressure greater than atmospheric pressure. In at least one embodiment, the non-catalytic steam cracker 20 is maintained at a pressure of about 0.21 MPa. The residence time of the internal fluids in the non-catalytic steam cracker 20 can range between about 0.01 seconds and about 60 seconds, alternately between about 0.05 seconds and about 30 seconds, or alternately between about 0.1 seconds and about 1 second. In at least one embodiment the residence time of the internal fluids in the non-catalytic steam cracker 20 is about 0.13 seconds. The non-catalytic steam cracker 20 produces a first light olefin fraction 120 and a first pyrolysis oil fraction 125. The first light olefin fraction 120 includes light olefins. The first pyrolysis oil fraction 125 includes gasoline (pyrolysis gasoline) and fuel oil (pyrolysis fuel oil). The first light olefin fraction 120 can undergo one or more purification stages (not shown).

A water supply (not shown) can be introduced to the non-catalytic steam cracker 20. In some embodiments, the distillate fraction 105 and the water supply can be premixed before being introduced to the non-catalytic steam cracker 20 using any type of mixing device capable of mixing the distillate fraction 105 and the water supply, such as a tee junction, a static mixer, an inline mixer, and impeller-embedded mixer. In other embodiments, the distillate fraction 105 and the water supply are separately introduced to the non-catalytic steam cracker 20. The distillate fraction 105 and the water supply are introduced to the non-catalytic steam cracker 20 having a water-to-oil mass flow ratio ranging between about 0.1 and about 1 at SATP, alternately between about 0.2 and about 0.85 at SATP, or alternately between about 0.3 and about 0.8 at SATP. In at least one embodiment, the water-to-oil mass flow ratio is about 0.62 at SATP.

The atmospheric residue fraction 110 is introduced to the supercritical water reactor 30. A water supply (not shown) is introduced to the supercritical water reactor 30. In some embodiments, the atmospheric residue fraction 110 and the water supply can be premixed before being introduced to the supercritical water reactor 30 using any type of mixing device capable of mixing the atmospheric residue fraction 110 and the water supply, such as a tee junction, a static mixer, an inline mixer, and impeller-embedded mixer. In other embodiments, the atmospheric residue fraction 110 and the water supply are separately introduced to the supercritical water reactor 30. The atmospheric residue fraction 110 and the water supply are introduced to the supercritical water reactor 30 having a water-to-oil mass flow ratio ranging between about 0.1 and about 10 at SATP, alternately between about 0.5 and about 7 at SATP, or alternately between about 1 and about 4 at SATP. In at least one embodiment, the water-to-oil mass flow ratio is about 1.2 at SATP. The water supply can be preheated to a temperature ranging between about 350 deg. C. and about 700 deg. C., alternately between about 400 deg. C. and about 650 deg. C., or alternately between about 450 deg. C. and about 600 deg. C. The water supply can be pre-pressurized to a pressure ranging between about 22 MPa and about 35 MPa, alternately between about 24 MPa and about 33 MPa, or alternately between about 26 MPa and about 30 MPa.

The supercritical water reactor 30 is maintained at a temperature and pressure such that the water is in its supercritical state. The supercritical water reactor 30 can be maintained at a temperature ranging between about 374 deg. C. and about 550 deg. C., alternately between about 380 deg. C. and about 480 deg. C., or alternately between about 415 deg. C. and about 450 deg. C. In at least one embodiment, the supercritical water reactor 30 is maintained at a temperature ranging between about 415 deg. C. and about 443 deg. C. Means for maintaining such temperature of the supercritical water reactor 30 can include a fired heater, box furnace, strip heater, immersion heater, tubular furnace, heat exchanger, or like devices known in the art. The supercritical water reactor 30 can be maintained at a pressure ranging between about 22.06 MPa and about 35 MPa, alternately between about 22.06 MPa and about 30 MPa, or alternately between about 24 MPa and about 28 MPa. In at least one embodiment, the supercritical water reactor 30 is maintained at a pressure of about 26.5 MPa. The supercritical water reactor 30 can be a tubular type reactor, a vessel type reactor, and combinations of the same. In at least one embodiment, the supercritical water reactor 30 is a tubular type reactor. The residence time of the internal fluids in the supercritical water reactor 30 can range between about 10 seconds and about 30 minutes (min), alternately between about 0.5 min and about 10 min, or alternately between about 1 min and about 50 min. In at least one embodiment the residence time of the internal fluids in the supercritical water reactor 30 is about 2.6 min. The residence time is calculated by assuming that the densities of the internal fluids in the supercritical water reactor 30 are substantially identical to that of water at operating conditions of the supercritical water reactor 30. In at least one embodiment, the supercritical water reactor 30 is in the absence of an external supply of catalyst. In at least one embodiment, the supercritical water reactor 30 is in the absence of an external supply of hydrogen. The product of the supercritical water reactor 30 is collected via an effluent stream 130.

The effluent stream 130 is introduced to the flash separator 40. The flash separator 40 separates the effluent stream 130 into a gas phase fraction 140 and a liquid phase fraction 145. In some embodiments, the flash separator 40 can be a flash column. In other embodiments, the flash separator 40 can be a simple fractionator, such as a flash drum. The flash column includes a primary separation zone, a secondary separation zone, and a heavy liquid collection zone. The effluent stream 130 can be introduced to the primary separation zone where a majority of the liquid phase fraction 145 is separated from the gas phase fraction 140. The secondary separation zone is located in the upper part of the flash column where liquids mixed in the gas phase fraction 140 are removed by gravitational force. In some embodiments, a catalyst bed can be placed in the secondary separation zone to capture these liquid particles. The heavy liquid collection zone is located in the lower part of the flash column where gases mixed in the liquid phase fraction 145 are removed by buoyant force. Certain design parameters of the flash column such as diameter and length can be determined by applicable engineering standards such as API 12 J (Specification of oil and gas separators). In some embodiments, the flash column can be a vertical- or horizontal-type flash column. In at least one embodiment, the flash column is a horizontal-type for having a greater interfacing area between the liquid phase and the gas phase internal fluids than the vertical-type. In some embodiments, the flash column can have a length-to-diameter aspect ratio ranging between about 2 and about 5.

The temperature and pressure of the effluent stream 130 are such that the flash separator 40 can be used to separate the effluent stream 130 into the gas phase fraction 140 and the liquid phase fraction 145. The flash separator 40 can be designed to generate gas phase components inside. The gas phase fraction 140 can include hydrocarbons having a TBP 95% less than about 400 deg. C., alternately less than about 380, or alternately less than about 340 deg. C. The gas phase fraction 140 can include hydrocarbon gas, naphtha, and atmospheric gasoil. The gas phase fraction 140 can include water. The liquid phase fraction 145 can include hydrocarbons having a TBP 5% greater than about 400 deg. C., alternately greater than about 380, or alternately greater than about 340 deg. C. In at least one embodiment, the liquid phase fraction 145 includes hydrocarbons having a TBP 5% greater than about 340 deg. C. The liquid phase fraction 145 can include light vacuum gasoil, heavy vacuum gasoil, and vacuum residue. The liquid phase fraction 145 can include water. The composition, including the hydrocarbon composition and the amount of water, of each of the gas phase fraction 140 and the liquid phase fraction 145 depends on the temperature and pressure in the flash separator 40. The temperature and pressure of the flash separator 40 can be adjusted to achieve the desired separation between the gas phase fraction 140 and the liquid phase fraction 145. In some embodiments, the flash separator 40 is operated such that the liquid hold-up time ranges between about 1 min and about 5 min for hydrocarbons in the liquid phase fraction 145 having an API gravity greater than about 10. In some embodiments, the flash separator 40 is operated such that the liquid hold-up time ranges between about 5 min and about 10 min for hydrocarbons in the liquid phase fraction 145 having an API gravity less than about 10.

The temperature and pressure of the flash separator 40 can be controlled to achieve a water content in the gas phase fraction 140 ranging between about 5 wt. % and about 95 wt. %, alternately between about 25 wt. % and about 90 wt. %, or alternately between about 30 wt. % and about 80 wt. %. In at least one embodiment, the water content in the gas phase fraction 140 is about 76.5 wt. %. The temperature and pressure of the flash separator 40 can be controlled to achieve a water content in the liquid phase fraction 145 ranging between about 0.1 wt. % and about 20 wt. %, alternately between about 0.2 wt. % and about 10 wt. %, or alternately between about 0.5 wt. % and about 7 wt. %. In at least one embodiment, the water content in the liquid phase fraction 145 is about 4.7 wt. %. The unconverted fractions from the effluent stream 130 can be included in the liquid phase fraction 145. Hydrocarbons that were dimerized or oligomerized in the supercritical water reactor 30 due to either lack of hydrogenation or resistance to thermal cracking can be included in the liquid phase fraction 145. The flash separator 40 can include an external heating component (not shown) to increase the temperature of the internal fluid. The external heating component can be any type known in the art capable of maintaining or increasing the temperature in a vessel. The flash separator 40 can include an internal heating component (not shown) to increase the temperature of the internal fluid. The flash separator 40 can include an internal mixing device. The internal mixing device can by any type of internal mixing device known in the art capable of enhancing mixing of the internal fluid. In at least one embodiment, the internal mixing device is an agitator. The flash separator 40 can be maintained at a temperature ranging between about 150 deg. C. and about 450 deg. C., alternately between about 180 deg. C. and about 400 deg. C., or alternately between about 200 deg. C. and about 350 deg. C. In at least one embodiment, the flash separator 40 is maintained at a temperature of about 270 deg. C. The flash separator 40 can be maintained at a pressure ranging between about 0.01 MPa and about 3 MPa, alternately between about 0.01 MPa and about 2 MPa, or alternately between about 0.01 MPa and about 1 MPa. In at least one embodiment, the flash separator 40 is maintained at a pressure of about 0.7 MPa.

The gas phase fraction 140 is introduced to the catalytic steam cracker 50. The gas phase fraction 140 introduced to the catalytic steam cracker 50 has a water-to-oil mass flow ratio ranging between about 0.1 and about 10 at SATP or alternately between about 0.5 and about 5 at SATP. In at least one embodiment, the water-to-oil mass flow ratio is about 3.26 at SATP. The gas phase fraction 140 is introduced to the catalytic steam cracker 50 at a weight hourly space velocity (WHSV) ranging between about 0.5 inverse hours ($hr^{-1}$) and about 100 $hr^{-1}$ or alternately between about 10 $hr^{-1}$ and 50 about $hr^{-1}$. In at least one embodiment the WHSV of the gas phase fraction 140 is about 3.7 $hr^{-1}$. The catalytic steam cracker 50 can be any hydrocarbon processing unit capable of steam cracking a hydrocarbon fraction including naphtha and atmospheric gasoil. In at least one embodiment, the catalytic steam cracker 50 is in the absence of an external supply of hydrogen. The catalytic steam cracker 50 includes a catalyst bed in the form of a fixed bed, ebullated bed, fluidized bed, or combinations of the same. The catalytic steam cracker 50 can include a zeolite catalyst. The zeolite catalyst can include a ZSM-22, a ZSM-23 type, an HZSM-5 type, a Zr-modified BEA type, and combinations of the same. The catalytic steam cracker 50 can be maintained at a temperature ranging between 400 deg. C. and about 750 deg. C. In at least one embodiment, the catalytic steam cracker 50 is maintained at a temperature of about 620 deg. C. Means for maintaining such temperature of the catalytic steam cracker 50 can include a fired heater, box furnace, strip heater, immersion heater, tubular furnace, heat exchanger, or like devices known in the art. The catalytic steam cracker 50 can be maintained at a pressure ranging between about zero and about 1.4 MPa. In at least one embodiment, the catalytic steam cracker 50 is maintained at a pressure of about 0.65 MPa. The residence time of the internal fluids in the catalytic steam cracker 50 calculated by WHSV can range between about 36 seconds and about 120 min, alternately between about 1.2 min and about 30 min, or alternately between about 2 min and about 20 min. In at least one embodiment the residence time of the internal fluids in the catalytic steam cracker 50 is about 16.2 min. The catalytic steam cracker 50 produces a second light olefin fraction 150 and a second pyrolysis oil fraction 155. The second light olefin fraction 150 includes light olefins. The second pyrolysis oil fraction 155 includes gasoline (pyrolysis gasoline) and fuel oil (pyrolysis fuel oil). The second light olefin fraction 150 can undergo one or more purification stages (not shown).

Figure 2:
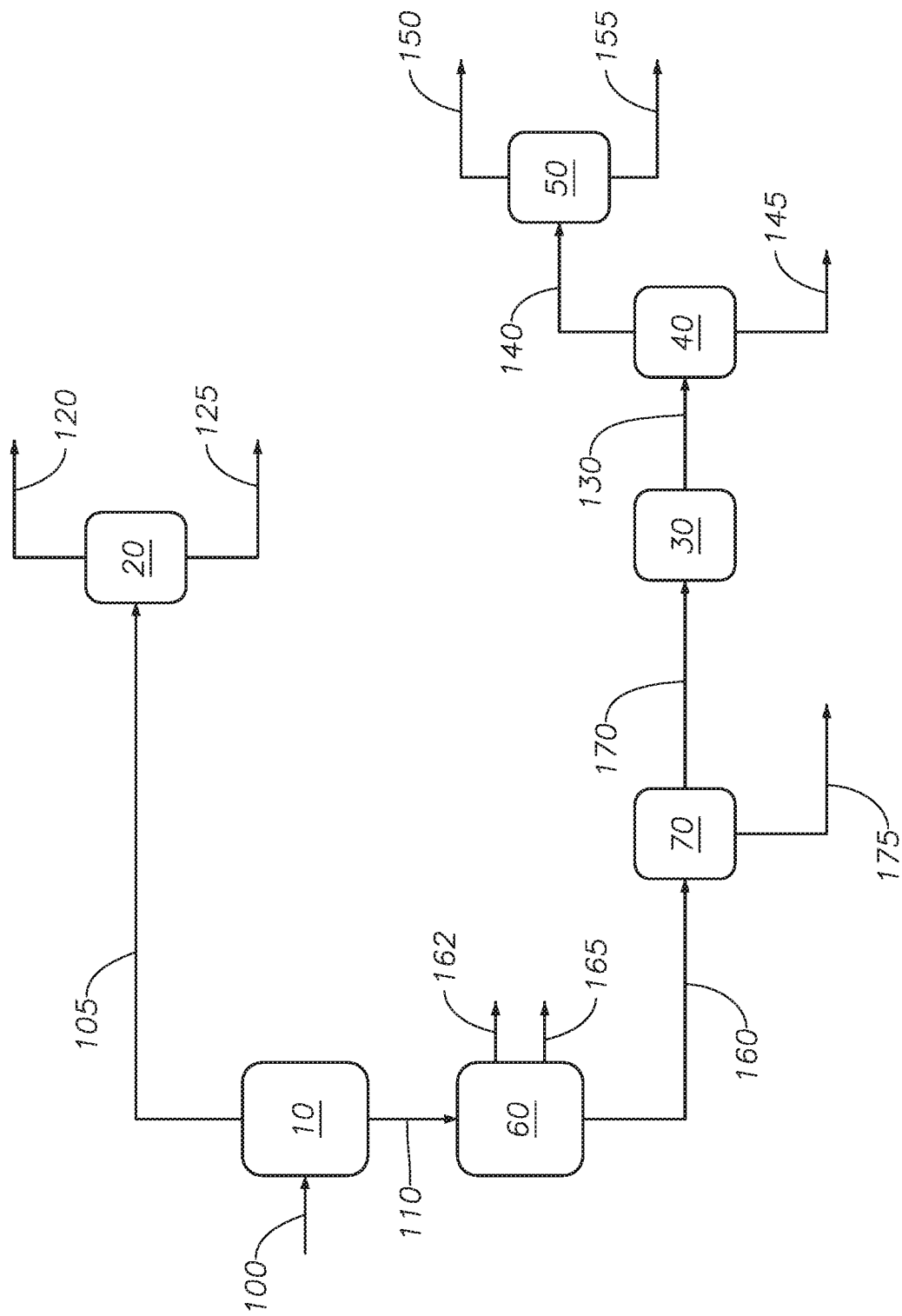
FIG. 2 provides a schematic diagram of a process for light olefin production, according to an embodiment of the disclosure.

FIG. 2 shows a schematic diagram of a process for light olefin production, according to an embodiment of the disclosure. The process can include a crude distillation unit 10, a non-catalytic steam cracker 20, a supercritical water reactor 30, a flash separator 40, a catalytic steam cracker 50, a vacuum distillation unit 60, and a solvent deasphalting unit 70.

A crude oil feed 100 is introduced to the process. The crude oil feed 100 can be obtained from any oil source derived from petroleum, coal liquid, or biomaterials. Non-limiting examples of crude oil used for the crude oil feed 100 can include whole range crude oil, distilled crude oil, topped crude oil, refinery streams, liquefied coals, liquid products recovered from oil or tar sands, bitumen, oil shale, asphaltene, liquid hydrocarbons recovered from GTL processes, and biomass derived hydrocarbons. The crude oil feed 100 can have an API gravity ranging between about 19 to about 54 or alternately between about 24 and about 40. For example, a Manifa crude oil has an API gravity of about 24. An Arab extra light crude oil has an API gravity of about 40. The crude oil feed 100 can include an atmospheric residue fraction greater than about 17 wt. % of the total crude oil or alternately greater than about 24 wt. % of the total crude oil.

The crude oil feed 100 is introduced to the crude distillation unit 10. The crude distillation unit 10 can be any hydrocarbon processing unit capable of separating crude oil into various fractions of different boiling ranges. In at least one embodiment, the crude distillation unit 10 is an atmospheric distillation unit. The crude distillation unit 10 produces a distillate fraction 105 and an atmospheric residue fraction 110. The distillate fraction 105 includes naphtha and atmospheric gasoil. The atmospheric residue fraction 110 includes atmospheric residue.

The distillate fraction 105 is introduced to the non-catalytic steam cracker 20. The non-catalytic steam cracker 20 can be any hydrocarbon processing unit capable of steam cracking a hydrocarbon fraction including naphtha and atmospheric gasoil. In at least one embodiment, the non-catalytic steam cracker 20 is in the absence of an external supply of catalyst. In at least one embodiment, the non-catalytic steam cracker 20 is in the absence of an external supply of hydrogen. The non-catalytic steam cracker 20 can be maintained at a temperature ranging between about 700 deg. C. and about 950 deg. C., alternately between about 750 deg. C. and about 900 deg. C., or alternately between about 750 deg. C. and about 875 deg. C. In at least one embodiment, the non-catalytic steam cracker 20 is maintained at a temperature ranging between about 700 deg. C. and about 830 deg. C. Means for maintaining such temperature of the non-catalytic steam cracker 20 can include a fired heater, box furnace, strip heater, immersion heater, tubular furnace, heat exchanger, or like devices known in the art. The non-catalytic steam cracker 20 can be maintained at a slightly elevated pressure greater than atmospheric pressure. In at least one embodiment, the non-catalytic steam cracker 20 is maintained at a pressure of about 0.21 MPa. The residence time of the internal fluids in the non-catalytic steam cracker 20 can range between about 0.01 seconds and about 60 seconds, alternately between about 0.05 seconds and about 30 seconds, or alternately between about 0.1 seconds and about 1 second. In at least one embodiment the residence time of the internal fluids in the non-catalytic steam cracker 20 is about 0.13 seconds. The non-catalytic steam cracker 20 produces a first light olefin fraction 120 and a first pyrolysis oil fraction 125. The first light olefin fraction 120 includes light olefins. The first pyrolysis oil fraction 125 includes gasoline (pyrolysis gasoline) and fuel oil (pyrolysis fuel oil). The first light olefin fraction 120 can undergo one or more purification stages (not shown).

A water supply (not shown) can be introduced to the non-catalytic steam cracker 20. In some embodiments, the distillate fraction 105 and the water supply can be premixed before being introduced to the non-catalytic steam cracker 20 using any type of mixing device capable of mixing the distillate fraction 105 and the water supply, such as a tee junction, a static mixer, an inline mixer, and impeller-embedded mixer. In other embodiments, the distillate fraction 105 and the water supply are separately introduced to the non-catalytic steam cracker 20. The distillate fraction 105 and the water supply are introduced to the non-catalytic steam cracker 20 having a water-to-oil mass flow ratio ranging between about 0.1 and about 1 at SATP, alternately between about 0.2 and about 0.85 at SATP, or alternately between about 0.3 and about 0.8 at SATP. In at least one embodiment, the water-to-oil mass flow ratio is about 0.62 at SATP.

The atmospheric residue fraction 110 is introduced to the vacuum distillation unit 60. The vacuum distillation unit 60 can be any hydrocarbon processing unit capable of separating an atmospheric residue fraction into various fractions of different boiling ranges. The vacuum distillation unit 60 produces a light vacuum gasoil fraction 162, a heavy vacuum gasoil fraction 165, and a vacuum residue fraction 160. The light vacuum gasoil fraction 162 includes light vacuum gasoil. The heavy vacuum gasoil fraction 165 includes heavy vacuum gasoil. The vacuum residue fraction 160 includes vacuum residue.

The vacuum residue fraction 160 is introduced to the solvent deasphalting unit 70. The solvent deasphalting unit 70 can be any hydrocarbon processing unit capable of separating asphaltene from other components of a hydrocarbon fraction. A solvent supply (not shown) can be introduced to the solvent deasphalting unit 70 such that the solvent allows the asphaltene to precipitate or aggregate. The precipitated or aggregated asphaltene is collected via an asphaltene-rich pitch fraction 175. In some embodiments, the resulting DAO fraction 170 can include the solvent. In other embodiments, the solvent can be recovered using a solvent recovery unit (not shown) such that the DAO fraction 170 does not include the solvent. Non-limiting examples of the solvent include propane, n-butane, n-pentane, and combinations of the same. The solvent deasphalting unit 70 is capable of producing a DAO fraction 170 having a DAO yield ranging between about 20 wt. % and about 90 wt. % or alternately between about 40 wt. % and about 75 wt. %. In at least one embodiment, the DAO yield is about 65 wt. %. In some embodiments, greater than about 40% of the asphaltene included in the atmospheric residue fraction 110 is removed by the solvent deasphalting unit 70. For example, the asphaltene content of the atmospheric residue fraction 110 can be about 16 wt. % where the asphaltene content of the DAO fraction 170 can be less than about 9.6 wt. %. The DAO fraction 170 can have a carbon-to-hydrogen mass ratio of less than about 7.8 or alternately less than about 7.0, which is indicative of a paraffinic fraction useful for steam cracking.

The DAO fraction 170 is introduced to the supercritical water reactor 30. A water supply (not shown) is introduced to the supercritical water reactor 30. In some embodiments, the DAO fraction 170 and the water supply can be premixed before being introduced to the supercritical water reactor 30 using any type of mixing device capable of mixing the DAO fraction 170 and the water supply, such as a tee junction, a static mixer, an inline mixer, and impeller-embedded mixer. In other embodiments, the DAO fraction 170 and the water supply are separately introduced to the supercritical water reactor 30. The DAO fraction 170 and the water supply are introduced to the supercritical water reactor 30 having a water-to-oil mass flow ratio ranging between about 0.1 and about 10 at SATP, alternately between about 0.5 and about 7 at SATP, or alternately between about 1 and about 4 at SATP. In at least one embodiment, the water-to-oil mass flow ratio is about 1.2 at SATP. The water supply can be preheated to a temperature ranging between about 350 deg. C. and about 700 deg. C., alternately between about 400 deg. C. and about 650 deg. C., or alternately between about 450 deg. C. and about 600 deg. C. The water supply can be pre-pressurized to a pressure ranging between about 22 MPa and about 35 MPa, alternately between about 24 MPa and about 33 MPa, or alternately between about 26 MPa and about 30 MPa.

The supercritical water reactor 30 is maintained at a temperature and pressure such that the water is in its supercritical state. The supercritical water reactor 30 can be maintained at a temperature ranging between about 374 deg. C. and about 550 deg. C., alternately between about 380 deg. C. and about 480 deg. C., or alternately between about 415 deg. C. and about 450 deg. C. In at least one embodiment, the supercritical water reactor 30 is maintained at a temperature ranging between about 415 deg. C. and about 443 deg. C. Means for maintaining such temperature of the supercritical water reactor 30 can include a fired heater, box furnace, strip heater, immersion heater, tubular furnace, heat exchanger, or like devices known in the art. The supercritical water reactor 30 can be maintained at a pressure ranging between about 22.06 MPa and about 35 MPa, alternately between about 22.06 MPa and about 30 MPa, or alternately between about 24 MPa and about 28 MPa. In at least one embodiment, the supercritical water reactor 30 is maintained at a pressure of about 26.5 MPa. The supercritical water reactor 30 can be a tubular type reactor, a vessel type reactor, and combinations of the same. In at least one embodiment, the supercritical water reactor 30 is a tubular type reactor. The residence time of the internal fluids in the supercritical water reactor 30 can range between about 10 seconds and about 30 min, alternately between about 0.5 min and about 10 min, or alternately between about 1 min and about 50 min. In at least one embodiment the residence time of the internal fluids in the supercritical water reactor 30 is about 2.6 min. The residence time is calculated by assuming that the densities of the internal fluids in the supercritical water reactor 30 are substantially identical to that of water at operating conditions of the supercritical water reactor 30. In at least one embodiment, the supercritical water reactor 30 is in the absence of an external supply of catalyst. In at least one embodiment, the supercritical water reactor 30 is in the absence of an external supply of hydrogen. The product of the supercritical water reactor 30 is collected via an effluent stream 130.

The effluent stream 130 is introduced to the flash separator 40. The flash separator 40 separates the effluent stream 130 into a gas phase fraction 140 and a liquid phase fraction 145. In some embodiments, the flash separator 40 can be a flash column. In other embodiments, the flash separator 40 can be a simple fractionator, such as a flash drum. The flash column includes a primary separation zone, a secondary separation zone, and a heavy liquid collection zone. The effluent stream 130 can be introduced to the primary separation zone where a majority of the liquid phase fraction 145 is separated from the gas phase fraction 140. The secondary separation zone is located in the upper part of the flash column where liquids mixed in the gas phase fraction 140 are removed by gravitational force. In some embodiments, a catalyst bed can be placed in the secondary separation zone to capture these liquid particles. The heavy liquid collection zone is located in the lower part of the flash column where gases mixed in the liquid phase fraction 145 are removed by buoyant force. Certain design parameters of the flash column such as diameter and length can be determined by applicable engineering standards such as API 12 J (Specification of oil and gas separators). In some embodiments, the flash column can be a vertical- or horizontal-type flash column. In at least one embodiment, the flash column is a horizontal-type for having a greater interfacing area between the liquid phase and the gas phase internal fluids than the vertical-type. In some embodiments, the flash column can have a length-to-diameter aspect ratio ranging between about 2 and about 5.

The temperature and pressure of the effluent stream 130 are such that the flash separator 40 can be used to separate the effluent stream 130 into the gas phase fraction 140 and the liquid phase fraction 145. The flash separator 40 can be designed to generate gas phase components inside. The gas phase fraction 140 can include hydrocarbons having a TBP 95% less than about 400 deg. C., alternately less than about 380, or alternately less than about 340 deg. C. The gas phase fraction 140 can include hydrocarbon gas, naphtha, and atmospheric gasoil. The gas phase fraction 140 can include water. The liquid phase fraction 145 can include hydrocarbons having a TBP 5% greater than about 400 deg. C., alternately greater than about 380, or alternately greater than about 340 deg. C. In at least one embodiment, the liquid phase fraction 145 includes hydrocarbons having a TBP 5% greater than about 340 deg. C. The liquid phase fraction 145 can include light vacuum gasoil, heavy vacuum gasoil, and vacuum residue. The liquid phase fraction 145 can include water. The composition, including the hydrocarbon composition and the amount of water, of each of the gas phase fraction 140 and the liquid phase fraction 145 depends on the temperature and pressure in the flash separator 40. The temperature and pressure of the flash separator 40 can be adjusted to achieve the desired separation between the gas phase fraction 140 and the liquid phase fraction 145. In some embodiments, the flash separator 40 is operated such that the liquid hold-up time ranges between about 1 min and about 5 min for hydrocarbons in the liquid phase fraction 145 having an API gravity greater than about 10. In some embodiments, the flash separator 40 is operated such that the liquid hold-up time ranges between about 5 min and about 10 min for hydrocarbons in the liquid phase fraction 145 having an API gravity less than about 10.

The temperature and pressure of the flash separator 40 can be controlled to achieve a water content in the gas phase fraction 140 ranging between about 5 wt. % and about 95 wt. %, alternately between about 25 wt. % and about 90 wt. %, or alternately between about 30 wt. % and about 80 wt. %. In at least one embodiment, the water content in the gas phase fraction 140 is about 76.5 wt. %. The temperature and pressure of the flash separator 40 can be controlled to achieve a water content in the liquid phase fraction 145 ranging between about 0.1 wt. % and about 20 wt. %, alternately between about 0.2 wt. % and about 10 wt. %, or alternately between about 0.5 wt. % and about 7 wt. %. In at least one embodiment, the water content in the liquid phase fraction 145 is about 4.7 wt. %. The unconverted fractions from the effluent stream 130 can be included in the liquid phase fraction 145. Hydrocarbons that were dimerized or oligomerized in the supercritical water reactor 30 due to either lack of hydrogenation or resistance to thermal cracking can be included in the liquid phase fraction 145. The flash separator 40 can include an external heating component (not shown) to increase the temperature of the internal fluid. The external heating component can be any type known in the art capable of maintaining or increasing the temperature in a vessel. The flash separator 40 can include an internal heating component (not shown) to increase the temperature of the internal fluid. The flash separator 40 can include an internal mixing device. The internal mixing device can by any type of internal mixing device known in the art capable of enhancing mixing of the internal fluid. In at least one embodiment, the internal mixing device is an agitator. The flash separator 40 can be maintained at a temperature ranging between about 150 deg. C. and about 450 deg. C., alternately between about 180 deg. C. and about 400 deg. C., or alternately between about 200 deg. C. and about 350 deg. C. In at least one embodiment, the flash separator 40 is maintained at a temperature of about 270 deg. C. The flash separator 40 can be maintained at a pressure ranging between about 0.01 MPa and about 3 MPa, alternately between about 0.01 MPa and about 2 MPa, or alternately between about 0.01 MPa and about 1 MPa. In at least one embodiment, the flash separator 40 is maintained at a pressure of about 0.7 MPa.

The gas phase fraction 140 is introduced to the catalytic steam cracker 50. The gas phase fraction 140 introduced to the catalytic steam cracker 50 has a water-to-oil mass flow ratio ranging between about 0.1 and about 10 at SATP or alternately between about 0.5 and about 5 at SATP. In at least one embodiment, the water-to-oil mass flow ratio is about 3.26 at SATP. The gas phase fraction 140 is introduced to the catalytic steam cracker 50 at a WHSV ranging between about 0.5 $hr^{-1}$ and about 100 $hr^{-1}$ or alternately between about 10 $hr^{-1}$ and 50 about $hr^{-1}$. In at least one embodiment the WHSV of the gas phase fraction 140 is about 3.7 $hr^{-1}$. The catalytic steam cracker 50 can be any hydrocarbon processing unit capable of steam cracking a hydrocarbon fraction including naphtha and atmospheric gasoil. In at least one embodiment, the catalytic steam cracker 50 is in the absence of an external supply of hydrogen. The catalytic steam cracker 50 includes a catalyst bed in the form of a fixed bed, ebullated bed, fluidized bed, or combinations of the same. The catalytic steam cracker 50 can include a zeolite catalyst. The zeolite catalyst can include a ZSM-22 type, a ZSM-23 type, an HZSM-5 type, a Zr-modified BEA type, and combinations of the same. The catalytic steam cracker 50 can be maintained at a temperature ranging between 400 deg. C. and about 750 deg. C. In at least one embodiment, the catalytic steam cracker 50 is maintained at a temperature of about 620 deg. C. Means for maintaining such temperature of the catalytic steam cracker 50 can include a fired heater, box furnace, strip heater, immersion heater, tubular furnace, heat exchanger, or like devices known in the art. The catalytic steam cracker 50 can be maintained at a pressure ranging between about zero and about 1.4 MPa. In at least one embodiment, the catalytic steam cracker 50 is maintained at a pressure of about 0.65 MPa. The residence time of the internal fluids in the catalytic steam cracker 50 calculated by WHSV can range between about 36 seconds and about 120 min, alternately between about 1.2 min and about 30 min, or alternately between about 2 min and about 20 min. In at least one embodiment the residence time of the internal fluids in the catalytic steam cracker 50 is about 16.2 min. The catalytic steam cracker 50 produces a second light olefin fraction 150 and a second pyrolysis oil fraction 155. The second light olefin fraction 150 includes light olefins. The second pyrolysis oil fraction 155 includes gasoline (pyrolysis gasoline) and fuel oil (pyrolysis fuel oil). The second light olefin fraction 150 can undergo one or more purification stages (not shown).

Figure 3:
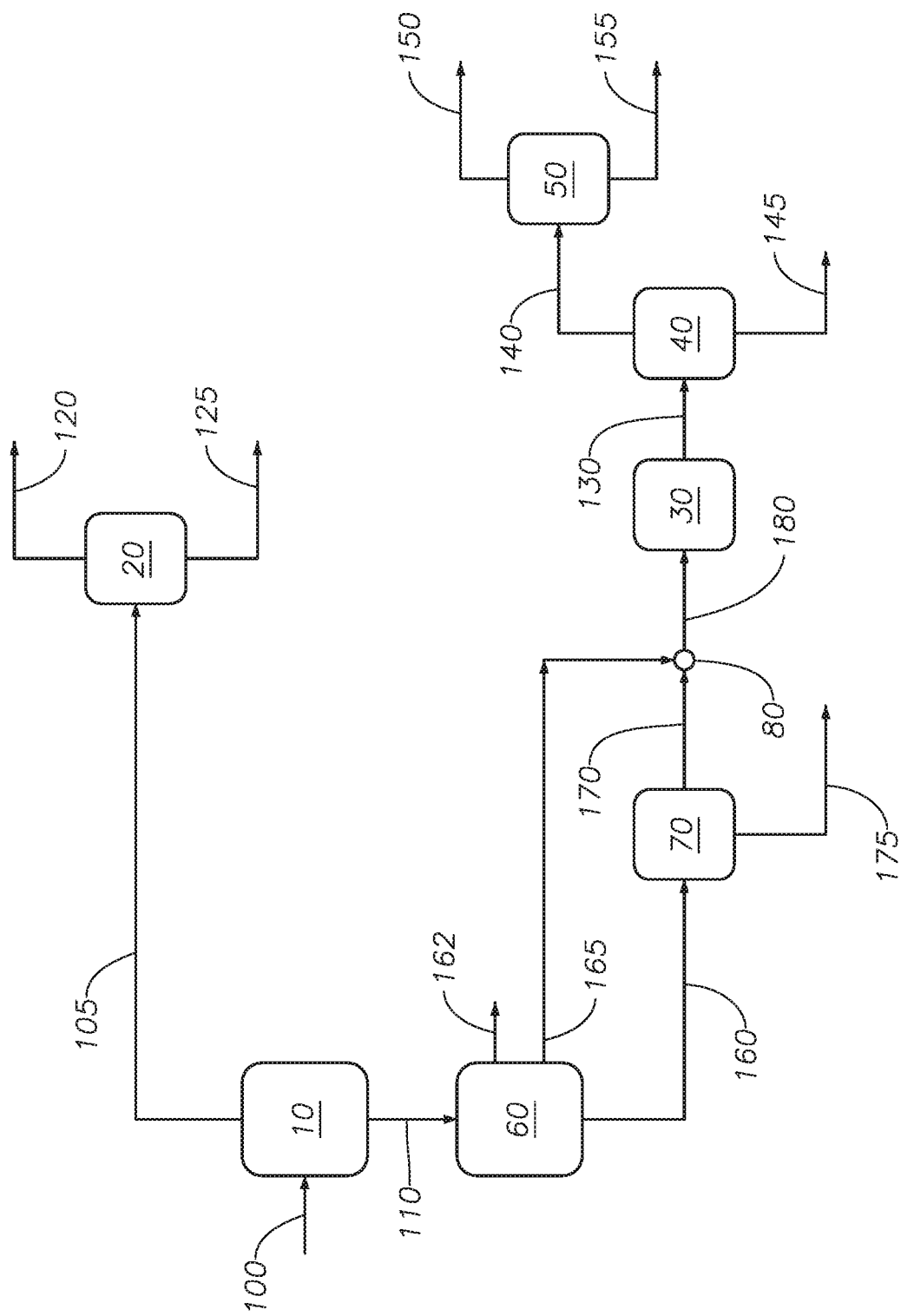
FIG. 3 provides a schematic diagram of a process for light olefin production, according to an embodiment of the disclosure.

FIG. 3 shows a schematic diagram of a process for light olefin production, according to an embodiment of the disclosure. The process can include a crude distillation unit 10, a non-catalytic steam cracker 20, a supercritical water reactor 30, a flash separator 40, a catalytic steam cracker 50, a vacuum distillation unit 60, a solvent deasphalting unit 70, and a mixer 80.

A crude oil feed 100 is introduced to the process. The crude oil feed 100 can be obtained from any oil source derived from petroleum, coal liquid, or biomaterials. Non-limiting examples of crude oil used for the crude oil feed 100 can include whole range crude oil, distilled crude oil, topped crude oil, refinery streams, liquefied coals, liquid products recovered from oil or tar sands, bitumen, oil shale, asphaltene, liquid hydrocarbons recovered from GTL processes, and biomass derived hydrocarbons. The crude oil feed 100 can have an API gravity ranging between about 19 to about 54 or alternately between about 24 and about 40. For example, a Manifa crude oil has an API gravity of about 24. An Arab extra light crude oil has an API gravity of about 40. The crude oil feed 100 can include an atmospheric residue fraction greater than about 17 wt. % of the total crude oil or alternately greater than about 24 wt. % of the total crude oil.

The crude oil feed 100 is introduced to the crude distillation unit 10. The crude distillation unit 10 can be any hydrocarbon processing unit capable of separating crude oil into various fractions of different boiling ranges. In at least one embodiment, the crude distillation unit 10 is an atmospheric distillation unit. The crude distillation unit 10 produces a distillate fraction 105 and an atmospheric residue fraction 110. The distillate fraction 105 includes naphtha and atmospheric gasoil. The atmospheric residue fraction 110 includes atmospheric residue.

The distillate fraction 105 is introduced to the non-catalytic steam cracker 20. The non-catalytic steam cracker 20 can be any hydrocarbon processing unit capable of steam cracking a hydrocarbon fraction including naphtha and atmospheric gasoil. In at least one embodiment, the non-catalytic steam cracker 20 is in the absence of an external supply of catalyst. In at least one embodiment, the non-catalytic steam cracker 20 is in the absence of an external supply of hydrogen. The non-catalytic steam cracker 20 can be maintained at a temperature ranging between about 700 deg. C. and about 950 deg. C., alternately between about 750 deg. C. and about 900 deg. C., or alternately between about 750 deg. C. and about 875 deg. C. In at least one embodiment, the non-catalytic steam cracker 20 is maintained at a temperature ranging between about 700 deg. C. and about 830 deg. C. Means for maintaining such temperature of the non-catalytic steam cracker 20 can include a fired heater, box furnace, strip heater, immersion heater, tubular furnace, heat exchanger, or like devices known in the art. The non-catalytic steam cracker 20 can be maintained at a slightly elevated pressure greater than atmospheric pressure. In at least one embodiment, the non-catalytic steam cracker 20 is maintained at a pressure of about 0.21 MPa. The residence time of the internal fluids in the non-catalytic steam cracker 20 can range between about 0.01 seconds and about 60 seconds, alternately between about 0.05 seconds and about 30 seconds, or alternately between about 0.1 seconds and about 1 second. In at least one embodiment the residence time of the internal fluids in the non-catalytic steam cracker 20 is about 0.13 seconds. The non-catalytic steam cracker 20 produces a first light olefin fraction 120 and a first pyrolysis oil fraction 125. The first light olefin fraction 120 includes light olefins. The first pyrolysis oil fraction 125 includes gasoline (pyrolysis gasoline) and fuel oil (pyrolysis fuel oil). The first light olefin fraction 120 can undergo one or more purification stages (not shown).

A water supply (not shown) can be introduced to the non-catalytic steam cracker 20. In some embodiments, the distillate fraction 105 and the water supply can be premixed before being introduced to the non-catalytic steam cracker 20 using any type of mixing device capable of mixing the distillate fraction 105 and the water supply, such as a tee junction, a static mixer, an inline mixer, and impeller-embedded mixer. In other embodiments, the distillate fraction 105 and the water supply are separately introduced to the non-catalytic steam cracker 20. The distillate fraction 105 and the water supply are introduced to the non-catalytic steam cracker 20 having a water-to-oil mass flow ratio ranging between about 0.1 and about 1 at SATP, alternately between about 0.2 and about 0.85 at SATP, or alternately between about 0.3 and about 0.8 at SATP. In at least one embodiment, the water-to-oil mass flow ratio is about 0.62 at SATP.

The atmospheric residue fraction 110 is introduced to the vacuum distillation unit 60. The vacuum distillation unit 60 can be any hydrocarbon processing unit capable of separating an atmospheric residue fraction into various fractions of different boiling ranges. The vacuum distillation unit 60 produces a light vacuum gasoil fraction 162, a heavy vacuum gasoil fraction 165, and a vacuum residue fraction 160. The light vacuum gasoil fraction 162 includes light vacuum gasoil. The heavy vacuum gasoil fraction 165 includes heavy vacuum gasoil. The vacuum residue fraction 160 includes vacuum residue. The heavy vacuum gasoil fraction 165 can have a carbon-to-hydrogen mass ratio of less than about 7.8 or alternately less than about 7.0, which is indicative of a paraffinic fraction useful for steam cracking.

The vacuum residue fraction 160 is introduced to the solvent deasphalting unit 70. The solvent deasphalting unit 70 can be any hydrocarbon processing unit capable of separating asphaltene from other components of a hydrocarbon fraction. A solvent supply (not shown) can be introduced to the solvent deasphalting unit 70 such that the solvent allows the asphaltene to precipitate or aggregate. The precipitated or aggregated asphaltene is collected via an asphaltene-rich pitch fraction 175. In some embodiments, the resulting DAO fraction 170 can include the solvent. In other embodiments, the solvent can be recovered using a solvent recovery unit (not shown) such that the DAO fraction 170 does not include the solvent. Non-limiting examples of the solvent include propane, n-butane, n-pentane, and combinations of the same. The solvent deasphalting unit 70 is capable of producing a DAO fraction 170 having a DAO yield ranging between about 20 wt. % and about 90 wt. % or alternately between about 40 wt. % and about 75 wt. %. In at least one embodiment, the DAO yield is about 65 wt. %. In some embodiments, greater than about 40% of the asphaltene included in the atmospheric residue fraction 110 is removed by the solvent deasphalting unit 70. For example, the asphaltene content of the atmospheric residue fraction 110 can be about 16 wt. % where the asphaltene content of the DAO fraction 170 can be less than about 9.6 wt. %. The DAO fraction 170 can have a carbon-to-hydrogen mass ratio of less than about 7.8 or alternately less than about 7.0, which is indicative of a paraffinic fraction useful for steam cracking.

The DAO fraction 170 and the heavy vacuum gasoil fraction 165 are passed to the mixer 80 to produce a mixed stream 180. The mixer 80 can be any type of mixing device capable of combining the DAO fraction 170 and the heavy vacuum gasoil fraction 165. Non-limiting examples of mixing devices suitable for use as the mixer 80 can include a static mixer, an inline mixer, and impeller-embedded mixer. The DAO fraction 170 and the heavy vacuum gasoil fraction 165 can be combined at a volume (or mass) ratio ranging between about 0.1 and about 10 or alternately between about 0.5 and about 5. In at least one embodiment, the DAO fraction 170 and the heavy vacuum gasoil fraction 165 are combined at a mass ratio of about 1.36.

The mixed stream 180 is introduced to the supercritical water reactor 30. A water supply (not shown) is introduced to the supercritical water reactor 30. In some embodiments, the mixed stream 180 and the water supply can be premixed before being introduced to the supercritical water reactor 30 using any type of mixing device capable of mixing the mixed stream 180 and the water supply, such as a tee junction, a static mixer, an inline mixer, and impeller-embedded mixer. In other embodiments, the mixed stream 180 and the water supply are separately introduced to the supercritical water reactor 30. The mixed stream 180 and the water supply are introduced to the supercritical water reactor 30 having a water-to-oil mass flow ratio ranging between about 0.1 and about 10 at SATP, alternately between about 0.5 and about 7 at SATP, or alternately between about 1 and about 4 at SATP. In at least one embodiment, the water-to-oil mass flow ratio is about 1.2 at SATP. The water supply can be preheated to a temperature ranging between about 350 deg. C. and about 700 deg. C., alternately between about 400 deg. C. and about 650 deg. C., or alternately between about 450 deg. C. and about 600 deg. C. The water supply can be pre-pressurized to a pressure ranging between about 22 MPa and about 35 MPa, alternately between about 24 MPa and about 33 MPa, or alternately between about 26 MPa and about 30 MPa.

The supercritical water reactor 30 is maintained at a temperature and pressure such that the water is in its supercritical state. The supercritical water reactor 30 can be maintained at a temperature ranging between about 374 deg. C. and about 550 deg. C., alternately between about 380 deg. C. and about 480 deg. C., or alternately between about 415 deg. C. and about 450 deg. C. In at least one embodiment, the supercritical water reactor 30 is maintained at a temperature ranging between about 415 deg. C. and about 443 deg. C. Means for maintaining such temperature of the supercritical water reactor 30 can include a fired heater, box furnace, strip heater, immersion heater, tubular furnace, heat exchanger, or like devices known in the art. The supercritical water reactor 30 can be maintained at a pressure ranging between about 22.06 MPa and about 35 MPa, alternately between about 22.06 MPa and about 30 MPa, or alternately between about 24 MPa and about 28 MPa. In at least one embodiment, the supercritical water reactor 30 is maintained at a pressure of about 26.5 MPa. The supercritical water reactor 30 can be a tubular type reactor, a vessel type reactor, and combinations of the same. In at least one embodiment, the supercritical water reactor 30 is a tubular type reactor. The residence time of the internal fluids in the supercritical water reactor 30 can range between about 10 seconds and about 30 min, alternately between about 0.5 min and about 10 min, or alternately between about 1 min and about 50 min. In at least one embodiment the residence time of the internal fluids in the supercritical water reactor 30 is about 2.6 min. The residence time is calculated by assuming that the densities of the internal fluids in the supercritical water reactor 30 are substantially identical to that of water at operating conditions of the supercritical water reactor 30. In at least one embodiment, the supercritical water reactor 30 is in the absence of an external supply of catalyst. In at least one embodiment, the supercritical water reactor 30 is in the absence of an external supply of hydrogen. The product of the supercritical water reactor 30 is collected via an effluent stream 130.

The effluent stream 130 is introduced to the flash separator 40. The flash separator 40 separates the effluent stream 130 into a gas phase fraction 140 and a liquid phase fraction 145. In some embodiments, the flash separator 40 can be a flash column. In other embodiments, the flash separator 40 can be a simple fractionator, such as a flash drum. The flash column includes a primary separation zone, a secondary separation zone, and a heavy liquid collection zone. The effluent stream 130 can be introduced to the primary separation zone where a majority of the liquid phase fraction 145 is separated from the gas phase fraction 140. The secondary separation zone is located in the upper part of the flash column where liquids mixed in the gas phase fraction 140 are removed by gravitational force. In some embodiments, a catalyst bed can be placed in the secondary separation zone to capture these liquid particles. The heavy liquid collection zone is located in the lower part of the flash column where gases mixed in the liquid phase fraction 145 are removed by buoyant force. Certain design parameters of the flash column such as diameter and length can be determined by applicable engineering standards such as API 12 J (Specification of oil and gas separators). In some embodiments, the flash column can be a vertical- or horizontal-type flash column. In at least one embodiment, the flash column is a horizontal-type for having a greater interfacing area between the liquid phase and the gas phase internal fluids than the vertical-type. In some embodiments, the flash column can have a length-to-diameter aspect ratio ranging between about 2 and about 5.

The temperature and pressure of the effluent stream 130 are such that the flash separator 40 can be used to separate the effluent stream 130 into the gas phase fraction 140 and the liquid phase fraction 145. The flash separator 40 can be designed to generate gas phase components inside. The gas phase fraction 140 can include hydrocarbons having a TBP 95% less than about 400 deg. C., alternately less than about 380, or alternately less than about 340 deg. C. The gas phase fraction 140 can include hydrocarbon gas, naphtha, and atmospheric gasoil. The gas phase fraction 140 can include water. The liquid phase fraction 145 can include hydrocarbons having a TBP 5% greater than about 400 deg. C., alternately greater than about 380, or alternately greater than about 340 deg. C. In at least one embodiment, the liquid phase fraction 145 includes hydrocarbons having a TBP 5% greater than about 340 deg. C. The liquid phase fraction 145 can include light vacuum gasoil, heavy vacuum gasoil, and vacuum residue. The liquid phase fraction 145 can include water. The composition, including the hydrocarbon composition and the amount of water, of each of the gas phase fraction 140 and the liquid phase fraction 145 depends on the temperature and pressure in the flash separator 40. The temperature and pressure of the flash separator 40 can be adjusted to achieve the desired separation between the gas phase fraction 140 and the liquid phase fraction 145. In some embodiments, the flash separator 40 is operated such that the liquid hold-up time ranges between about 1 min and about 5 min for hydrocarbons in the liquid phase fraction 145 having an API gravity greater than about 10. In some embodiments, the flash separator 40 is operated such that the liquid hold-up time ranges between about 5 min and about 10 min for hydrocarbons in the liquid phase fraction 145 having an API gravity less than about 10.

The temperature and pressure of the flash separator 40 can be controlled to achieve a water content in the gas phase fraction 140 ranging between about 5 wt. % and about 95 wt. %, alternately between about 25 wt. % and about 90 wt. %, or alternately between about 30 wt. % and about 80 wt. %. In at least one embodiment, the water content in the gas phase fraction 140 is about 76.5 wt. %. The temperature and pressure of the flash separator 40 can be controlled to achieve a water content in the liquid phase fraction 145 ranging between about 0.1 wt. % and about 20 wt. %, alternately between about 0.2 wt. % and about 10 wt. %, or alternately between about 0.5 wt. % and about 7 wt. %. In at least one embodiment, the water content in the liquid phase fraction 145 is about 4.7 wt. %. The unconverted fractions from the effluent stream 130 can be included in the liquid phase fraction 145. Hydrocarbons that were dimerized or oligomerized in the supercritical water reactor 30 due to either lack of hydrogenation or resistance to thermal cracking can be included in the liquid phase fraction 145. The flash separator 40 can include an external heating component (not shown) to increase the temperature of the internal fluid. The external heating component can be any type known in the art capable of maintaining or increasing the temperature in a vessel. The flash separator 40 can include an internal heating component (not shown) to increase the temperature of the internal fluid. The flash separator 40 can include an internal mixing device. The internal mixing device can by any type of internal mixing device known in the art capable of enhancing mixing of the internal fluid. In at least one embodiment, the internal mixing device is an agitator. The flash separator 40 can be maintained at a temperature ranging between about 150 deg. C. and about 450 deg. C., alternately between about 180 deg. C. and about 400 deg. C., or alternately between about 200 deg. C. and about 350 deg. C. In at least one embodiment, the flash separator 40 is maintained at a temperature of about 270 deg. C. The flash separator 40 can be maintained at a pressure ranging between about 0.01 MPa and about 3 MPa, alternately between about 0.01 MPa and about 2 MPa, or alternately between about 0.01 MPa and about 1 MPa. In at least one embodiment, the flash separator 40 is maintained at a pressure of about 0.7 MPa.

The gas phase fraction 140 is introduced to the catalytic steam cracker 50. The gas phase fraction 140 introduced to the catalytic steam cracker 50 has a water-to-oil mass flow ratio ranging between about 0.1 and about 10 at SATP or alternately between about 0.5 and about 5 at SATP. In at least one embodiment, the water-to-oil mass flow ratio is about 3.26 at SATP. The gas phase fraction 140 is introduced to the catalytic steam cracker 50 at a WHSV ranging between about 0.5 $hr^{-1}$ and about 100 $hr^{-1}$ or alternately between about 10 $hr^{-1}$ and 50 about $hr^{-1}$. In at least one embodiment the WHSV of the gas phase fraction 140 is about 3.7 $hr^{-1}$. The catalytic steam cracker 50 can be any hydrocarbon processing unit capable of steam cracking a hydrocarbon fraction including naphtha and atmospheric gasoil. In at least one embodiment, the catalytic steam cracker 50 is in the absence of an external supply of hydrogen. The catalytic steam cracker 50 includes a catalyst bed in the form of a fixed bed, ebullated bed, fluidized bed, or combinations of the same. The catalytic steam cracker 50 can include a zeolite catalyst. The zeolite catalyst can include a ZSM-22 type, a ZSM-23 type, an HZSM-5 type, a Zr-modified BEA type, and combinations of the same. The catalytic steam cracker 50 can be maintained at a temperature ranging between about 400 deg. C. and about 750 deg. C. In at least one embodiment, the catalytic steam cracker 50 is maintained at a temperature of about 620 deg. C. Means for maintaining such temperature of the catalytic steam cracker 50 can include a fired heated, box furnace, strip heater, immersion heater, tubular furnace, heat exchanger, or like devices known in the art. The catalytic steam cracker 50 can be maintained at a pressure ranging between about zero and about 1.4 MPa. In at least one embodiment, the catalytic steam cracker 50 is maintained at a pressure of about 0.65 MPa. The residence time of the internal fluids in the catalytic steam cracker 50 calculated by WHSV can range between about 36 seconds and about 120 min, alternately between about 1.2 min and about 30 min, or alternately between about 2 min and about 20 min. In at least one embodiment the residence time of the internal fluids in the catalytic steam cracker 50 is about 16.2 min. The catalytic steam cracker 50 produces a second light olefin fraction 150 and a second pyrolysis oil fraction 155. The second light olefin fraction 150 includes light olefins. The second pyrolysis oil fraction 155 includes gasoline (pyrolysis gasoline) and fuel oil (pyrolysis fuel oil). The second light olefin fraction 150 can undergo one or more purification stages (not shown).

EXAMPLE

The disclosure is illustrated by the following example, which are presented for illustrative purposes only, and are not intended as limiting the scope of the invention which is defined by the appended claims.

A process having a configuration similar to FIG. 3 was modelled using the HYSYS Hydroprocessing Model (Aspen Technology, Inc., Bedford Mass.). In reference to the properties of the stream for Example, the description and stream numbers for FIG. 3 is used.

A crude oil feed (stream 100) was introduced to the respective process. The crude oil feed was a 120,000 barrel per day of Arabian Medium crude oil, having an API gravity of about 31.1 and a sulfur content of about 2.41 wt. %. The crude oil feed was introduced to a crude distillation unit (unit 10). The crude distillation unit produced a distillate fraction (stream 105) and an atmospheric residue fraction (stream 110). Composition and certain properties of the distillate fraction are shown in Table 1.

TABLE 1

| Property | Naphtha | Atmospheric Gasoil |
|---|---|---|
| Quantity (metric ton per day or MTD) | 4,572 | 2,752 |
| TBP 5% (deg. C.) | 46 | 226 |
| TBP 90% (deg. C.) | 218 | 335 |
| API Gravity | 57.4 | 35.1 |
| Sulfur Content (wt. %) | 0.11 | 1.36 |
| Carbon-to-Hydrogen Ratio | 6.0 | 6.6 |
| Watson k Factor | 11.07 | 11.77 |

Composition and certain properties of the atmospheric residue fraction are shown in Table 2.

TABLE 2

| Property | Atmospheric Residue (Stream 110) |
|---|---|
| Quantity (MTD) | 8,848 |
| TBP 5% (deg. C.) | 334 |
| TBP 90% (deg. C.) | 510 |
| API Gravity | 14.2 |
| Sulfur Content (wt. %) | 3.9 |
| Carbon-to-Hydrogen Ratio | 7.2 |
| Watson k Factor | 11.6 |

The distillate fraction was introduced to a non-catalytic steam cracker (unit 20). The non-catalytic steam cracker was a coil-type reactor. The water-to-hydrocarbon mass ratio was maintained at about 0.62 at SATP. The outlet pressure of the non-catalytic steam cracker was about 0.21 MPa. The inlet and outlet temperature of the non-catalytic steam cracker was about 620 deg. C. and about 830 deg. C., respectively. The residence time of the internal fluids in the non-catalytic steam cracker was about 0.13 seconds. The non-catalytic steam cracker produced a light olefin fraction (stream 120) and a pyrolysis oil fraction (stream 125). The light olefin fraction included about 2,460 MTD of ethylene and about 1,305 MTD of propylene. The pyrolysis oil fraction included about 1,799 MTD of pyrolysis gasoline and about 978 MTD of pyrolysis fuel oil.

The atmospheric residue fraction was introduced to a vacuum distillation unit (unit 60). The vacuum distillation unit produced a light vacuum gasoil fraction (stream 162), a heavy vacuum gasoil fraction (stream 165), and a vacuum residue fraction (stream 160). Composition and certain properties of the light vacuum gasoil fraction, the heavy vacuum gasoil fraction, and the vacuum residue fraction are shown in Table 3.

TABLE 3

| Property | Light Vacuum Gasoil (Stream 162) | Heavy Vacuum Gasoil (Stream 165) | Vacuum Residue (Stream 160) |
|---|---|---|---|
| Quantity (MTD) | 2,223 | 2,141 | 4,484 |
| TBP 5% (deg. C.) | 324 | 416 | 556 |
| TBP 90% (deg. C.) | 425 | 530 | — |
| API Gravity | 24.7 | 19.0 | 4.6 |
| Sulfur Content (wt. %) | 3 | 3 | 5 |
| Carbon-to-Hydrogen Ratio | 7.0 | 7.0 | 8.9 |
| Watson k Factor | 11.7 | 11.8 | 11.4 |

The vacuum residue was introduced to a solvent deasphalting unit (unit 70). The solvent deasphalting unit produced a DAO fraction (stream 170) and a pitch fraction (stream 175). The DAO yield was about 65 wt. %. Composition and certain properties of the DAO fraction are shown in Table 4.

TABLE 4

| Property | DAO Fraction (Stream 170) |
|---|---|
| Quantity (MTD) | 2.914 |
| TBP 5% (deg. C.) | 494 |
| TBP 90% (deg. C.) | — |
| API Gravity | 12.1 |
| Sulfur Content (wt. %) | 4 |
| Carbon-to-Hydrogen Ratio | 7.5 |
| Watson k Factor | 11.6 |

The heavy vacuum gasoil fraction and the DAO fraction were combined (stream 180) and introduced to a supercritical water reactor (unit 30). The supercritical water reactor was a tubular-type reactor. The water-to-hydrocarbon mass ratio was maintained at about 1.2 at SATP. The pressure was maintained at about 26.5 MPa. The inlet and outlet temperature of the supercritical water reactor was about 415 deg. C. and about 443 deg. C., respectively. The residence time of the internal fluids in the supercritical water reactor was about 2.6 min. The supercritical water reactor produced an effluent stream (stream 130).

The effluent stream was cooled to a temperature of about 270 deg. C. and depressurized to about 0.7 MPa. The effluent stream was introduced to a flash separator (unit 40). The effluent stream was separated into a gas phase fraction (stream 140) and a liquid phase fraction (stream 145). The flash column was maintained at a temperature of about 270 deg. C. and a pressure of about 0.7 MPa. The gas phase fraction included 1,768 MTD of hydrocarbons and 5,758 MTD of water. Accordingly, the gas phase fraction had a water content of about 76.5 wt. %. The liquid phase fraction included 3,161 MTD of hydrocarbons and 157 MTD of water. Accordingly, the liquid phase fraction had a water content of about 4.7 wt. %. Composition and certain properties of hydrocarbons included in the gas phase fraction and the liquid phase fraction are shown in Table 5.

TABLE 5

| Property | Hydrocarbons in Gas Phase Fraction (Stream 140) | Hydrocarbons in Liquid Phase Fraction (Stream 145) |
| --- | --- | --- |
| Quantity (MTD) | 1.768 | 3,161 |
| TBP 5% (deg. C.) | 65 | 556 |
| TBP 90% (deg. C.) | 387 | — |
| API Gravity | 40.1 | 4.6 |
| Sulfur Content (wt. %) | 0.85 | 2.53 |
| Carbon-to-Hydrogen Ratio | 6.1 | 8.9 |
| Watson k Factor | 12.0 | 11.4 |

The gas phase fraction was introduced to a catalytic steam cracker (unit 50) at a WHSV of about 3.7 $hr^{-1}$. The catalytic steam cracker included a fixed catalyst bed where a zeolite-based catalyst was used. The water-to-hydrocarbon mass ratio was maintained at about 3.25 at SATP to mitigate the negative effect of sulfur to the catalyst. The pressure of the catalytic steam cracker was maintained at about 0.65 MPa. The weight average bed temperature (WABT) was maintained at about 620 deg. C. The residence time of the internal fluids in the catalytic steam cracker was about 16.2 min. The catalytic steam cracker produced a light olefin fraction (stream 150) and a pyrolysis oil fraction (stream 155). The light olefin fraction included about 320 MTD of ethylene and about 345 MTD of propylene. The pyrolysis oil fraction included about 1,969 MTD of pyrolysis gasoline and about 1,192 MTD of pyrolysis fuel oil.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for producing light olefins from a crude oil, the method comprising the steps of:
    introducing a crude oil feed to a crude distillation unit to produce a distillate fraction and a residue fraction, wherein the crude oil feed comprises the crude oil, wherein the distillate fraction comprises hydrocarbons having a true boiling point less than that of the residue fraction;
    introducing the distillate fraction to a first steam cracker, wherein the first steam cracker is operated at a temperature and pressure such that the distillate fraction undergoes cracking reactions in the presence of steam to produce a first light olefin fraction and a first pyrolysis oil fraction, wherein the first light olefin fraction comprises the light olefins;
    introducing the residue fraction to a supercritical water reactor, wherein the supercritical water reactor is operated at a pressure equal to or greater than 22.06 MPa and a temperature equal to or greater than 373.9 deg. C. such that the residue fraction undergoes conversion reactions in the presence of supercritical water to produce an effluent stream;
    introducing the effluent stream to a flash separator to produce a gas phase fraction and a liquid phase fraction; and
    introducing the gas phase fraction to a second steam cracker, wherein the second steam cracker is a catalytic steam cracker, wherein the second steam cracker is operated at a temperature and pressure such that the gas phase fraction undergoes cracking reactions in the presence of steam to produce a second light olefin fraction and a second pyrolysis oil fraction, wherein the second light olefin fraction comprises the light olefins.

2. The method of claim 1, wherein the crude oil has an atmospheric residue content of greater than 24 wt. %.

3. The method of claim 1, wherein the distillate fraction comprises naphtha and atmospheric gasoil, wherein the residue fraction comprises atmospheric residue.

4. The method of claim 1, further comprising the step of:
    introducing water to the first steam cracker.

5. The method of claim 1, wherein the first steam cracker is in the absence of an external supply of catalyst.

6. The method of claim 1, wherein the first steam cracker is in the absence of an external supply of hydrogen.

7. The method of claim 1, wherein the first pyrolysis oil fraction comprises gasoline and fuel oil.

8. The method of claim 1, further comprising the step of:
    introducing water to the supercritical water reactor.

9. The method of claim 8, wherein internal fluids of the supercritical water reactor have a water-to-oil mass ratio between 1 and 4 at SATP.

10. The method of claim 1, wherein the supercritical water reactor is operated at a temperature ranging between 415 deg. C. and 443 deg. C. and a pressure ranging between 24 MPa and 28 MPa.

11. The method of claim 1, wherein the flash separator is operated at a temperature ranging between 200 deg. C. and 350 deg. C. and a pressure ranging between 0.01 MPa and 1 MPa.

12. The method of claim 1, wherein the gas phase fraction comprises naphtha and atmospheric gasoil.

13. The method of claim 1, wherein the gas phase stream has a water content ranging between 30 wt. % and 80 wt. %.

14. The method of claim 1, wherein the second steam cracker includes a zeolite catalyst selected from the group consisting of: a ZSM-22 type, a ZSM-23 type, an HZSM-5 type, a Zr-modified BEA type, and combinations of the same.

15. The method of claim 1, wherein the second steam cracker is in the absence of an external supply of hydrogen.

16. The method of claim 1, wherein the second pyrolysis oil fraction comprises gasoline and fuel oil.

17. The method of claim 1, further comprising the steps of:
introducing the residue fraction to a vacuum distillation unit to produce a light vacuum gasoil fraction, a heavy vacuum gasoil fraction, and a vacuum residue fraction; and
introducing the vacuum residue fraction to a solvent deasphalting unit to produce a deasphalted oil fraction and a pitch fraction, wherein the pitch fraction comprises asphaltenes,
wherein the deasphalted oil fraction is introduced to the supercritical water reactor in lieu of the residue fraction.

18. The method of claim 1, further comprising the steps of:
introducing the residue fraction to a vacuum distillation unit to produce a light vacuum gasoil fraction, a heavy vacuum gasoil fraction, and a vacuum residue fraction;
introducing the vacuum residue fraction to a solvent deasphalting unit to produce a deasphalted oil fraction and a pitch fraction, wherein the pitch fraction comprises asphaltenes; and
combining the heavy vacuum gasoil fraction and the deasphalted oil fraction to produce a mixed stream,
wherein the mixed stream is introduced to the supercritical water reactor in lieu of the residue fraction.

19. A system for producing light olefins from a crude oil, the system comprising:
a crude distillation unit, the crude distillation unit configured to separate a crude oil feed into a distillate fraction and a residue fraction, wherein the crude oil feed comprises the crude oil having an atmospheric residue content of greater than 24 wt. %, wherein the distillate fraction comprises naphtha and atmospheric gasoil, wherein the residue fraction comprises atmospheric residue;
a first steam cracker, the first steam cracker fluidly connected downstream of the crude distillation unit, the first steam cracker configured to be operated at a temperature and pressure such that the distillate fraction undergoes cracking reactions in the presence of steam to produce a first light olefin fraction and a first pyrolysis oil fraction, wherein the first light olefin fraction comprises the light olefins, wherein the first pyrolysis oil fraction comprises gasoline and fuel oil;
a supercritical water reactor, the supercritical water reactor fluidly connected downstream of the crude distillation unit, the supercritical water reactor configured to be operated at a pressure equal to or greater than 22.06 MPa and a temperature equal to or greater than 373.9 deg. C. such that the residue fraction undergoes conversion reactions in the presence of supercritical water to produce an effluent stream;
a flash separator, the flash separator fluidly connected downstream of the supercritical water reactor, the flash separator configured to separate the effluent stream into a gas phase fraction and a liquid phase fraction; and
a second steam cracker, the second steam cracker fluidly connected downstream of the flash separator, the second steam cracker being a catalytic steam cracker, the second steam cracker configured to be operated at a temperature and pressure such that the gas phase fraction undergoes cracking reactions in the presence of steam to produce a second light olefin fraction and a second pyrolysis oil fraction, wherein the second light olefin fraction comprises the light olefins, wherein the second pyrolysis oil fraction comprises gasoline and fuel oil.

20. The system of claim 19, wherein the second steam cracker includes a zeolite catalyst selected from the group consisting of: a ZSM-22 type, a ZSM-23 type, an HZSM-5 type, a Zr-modified BEA type, and combinations of the same.

21. The system of claim 19, further comprising:
a vacuum distillation unit, the vacuum distillation unit fluidly connected downstream of the crude distillation unit, the vacuum distillation unit configured to separate the residue fraction into a light vacuum gasoil fraction, a heavy vacuum gasoil fraction, and a vacuum residue fraction;
a solvent deasphalting unit, the solvent deasphalting unit fluidly connected downstream of the vacuum distillation unit and fluidly connected upstream of the supercritical water reactor, the solvent deasphalting unit configured to separate the vacuum residue fraction into a deasphalted oil fraction and a pitch fraction, wherein the pitch fraction comprises asphaltenes, wherein the deasphalted oil fraction is introduced to the supercritical water reactor in lieu of the residue fraction.

22. The system of claim 19, further comprising:
a vacuum distillation unit, the vacuum distillation unit fluidly connected downstream of the crude distillation unit, the vacuum distillation unit configured to separate the residue fraction into a light vacuum gasoil fraction, a heavy vacuum gasoil fraction, and a vacuum residue fraction;
a solvent deasphalting unit, the solvent deasphalting unit fluidly connected downstream of the vacuum distillation unit, the solvent deasphalting unit configured to separate the vacuum residue fraction into a deasphalted oil fraction and a pitch fraction, wherein the pitch fraction comprises asphaltenes;
a mixer, the mixer fluidly connected downstream of the vacuum distillation unit, fluidly connected downstream of the solvent deasphalting unit, and fluidly connected upstream of the supercritical water reactor, the mixer configured to combine the heavy vacuum gasoil fraction and the deasphalted oil fraction to produce a mixed stream, wherein the mixed stream is introduced to the supercritical water reactor in lieu of the residue fraction.

* * * * *